United States Patent
Jin et al.

(10) Patent No.: US 12,321,290 B2
(45) Date of Patent: Jun. 3, 2025

(54) MEMORY DEVICE SUPPORTING A HIGH-EFFICIENT INPUT/OUTPUT INTERFACE AND A MEMORY SYSTEM INCLUDING THE MEMORY DEVICE

(71) Applicant: SAMSUNG ELECTRONICS CO., LTD., Suwon-si (KR)

(72) Inventors: Hyungmin Jin, Seoul (KR); Jindo Byun, Suwon-si (KR); Younghoon Son, Yongin-si (KR); Youngdon Choi, Seoul (KR); Junghwan Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/772,354

(22) Filed: Jul. 15, 2024

(65) Prior Publication Data
US 2024/0370386 A1 Nov. 7, 2024

Related U.S. Application Data

(63) Continuation of application No. 18/242,034, filed on Sep. 5, 2023, now Pat. No. 12,061,561, which is a
(Continued)

(30) Foreign Application Priority Data

Oct. 16, 2020 (KR) ........................ 10-2020-0134639

(51) Int. Cl.
*G06F 13/16* (2006.01)
*H04L 25/49* (2006.01)

(52) U.S. Cl.
CPC ...... *G06F 13/1668* (2013.01); *H04L 25/4917* (2013.01)

(58) Field of Classification Search
None
See application file for complete search history.

(56) References Cited

U.S. PATENT DOCUMENTS 7,124,221 B1 10/2006 Zerbe et al.
7,308,048 B2 12/2007 Wei
(Continued)

OTHER PUBLICATIONS

European Search Report issued in corresponding EP Patent Application No. 21182479.2 on Dec. 6, 2021.
(Continued)

*Primary Examiner* — Michael Sun
(74) *Attorney, Agent, or Firm* — MORGAN, LEWIS & BOCKIUS LLP

(57) ABSTRACT

A memory system including: a memory controller to transmit a command, an address, or data to a first channel based on a data input/output signal having one of N (N is a natural number of three or more) different voltage levels during a first time interval, the memory controller transmitting the command, the address, or the data not transmitted during the first time interval to the first channel based on the data input/output signal having one of two different voltage levels during a second time interval; and a memory device to sample the data input/output signal received via the first channel during the first time interval in a pulse amplitude modulation (PAM)-N mode, the memory device sampling the data input/output signal received via the first channel during the second time interval in a non return to zero (NRZ) mode.

20 Claims, 23 Drawing Sheets

Related U.S. Application Data continuation of application No. 17/903,240, filed on Sep. 6, 2022, now Pat. No. 11,789,879, which is a continuation of application No. 17/326,513, filed on May 21, 2021, now Pat. No. 11,461,251.

(56) References Cited

U.S. PATENT DOCUMENTS

| | | |
|---|---|---|
| 7,558,131 B2 | 7/2009 | Han |
| 7,679,133 B2 | 3/2010 | Son et al. |
| 7,685,364 B2 | 3/2010 | Shaeffer et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,861,578 B1 | 10/2014 | Lusted et al. |
| 9,699,009 B1 * | 7/2017 | Ainspan ............ H04L 25/49 |
| 9,911,469 B1 * | 3/2018 | Hollis ............... G11C 7/1045 |
| 10,355,893 B2 | 7/2019 | Hasbun et al. |
| 10,403,337 B2 | 9/2019 | Butterfield |
| 10,425,260 B2 | 9/2019 | Hollis et al. |
| 10,446,198 B2 * | 10/2019 | Hasbun ............. G11C 7/1048 |
| 10,541,010 B2 | 1/2020 | Hollis |
| 11,233,681 B2 | 1/2022 | Hollis et al. |
| 11,461,251 B2 | 10/2022 | Jin et al. |
| 11,789,879 B2 | 10/2023 | Jin et al. |
| 2011/0233648 A1 | 9/2011 | Seol et al. |
| 2015/0003505 A1 | 1/2015 | Lusted et al. |
| 2018/0165023 A1 | 6/2018 | Oh et al. |
| 2019/0103143 A1 | 4/2019 | Hasbun et al. |
| 2020/0125505 A1 | 4/2020 | Brox et al. |
| 2020/0159436 A1 * | 5/2020 | Walker ............. G06F 3/0656 |
| 2020/0293230 A1 | 9/2020 | Spirkl et al. |
| 2022/0121582 A1 | 4/2022 | Jin et al. |
| 2022/0414032 A1 | 12/2022 | Jin et al. |
| 2023/0409496 A1 | 12/2023 | Jin et al. |

OTHER PUBLICATIONS

Office Action issued in corresponding KR Application No. 10-2020-0134639 on Dec. 26, 2024.

* cited by examiner

FIG. 9

| CASE | CONDITION | MODE |
|---|---|---|
| CASE 1 | CLE = "enable" or ALE ="enable" | PAM-4 |
| | CLE = "disable" and ALE ="disable" | NRZ |
| CASE 2 | DQE = "VL1" or "VL2" | PAM-4 |
| | DQE = "VL3" or "VL4" | NRZ |
| CASE 3 | nWE = "toggle" | PAM-4 |
| | nWE = "toggle off" | NRZ |
| CASE 4 | DQS = "toggle off" | PAM-4 |
| | DQS = "toggle " or nRE = "toggle" | NRZ |
| CASE 5 | MSS = '1' | PAM-4 |
| | MSS = '0' | NRZ |

FIG. 11A

| MODE | CMD/ADDR/DATA | | BT1 | BT0 | DQ |
|---|---|---|---|---|---|
| | MSB | LSB | | | |
| PAM-4 | 1 | 1 | 0 | 0 | VL1 |
| | 1 | 0 | 0 | 1 | VL2 |
| | 0 | 1 | 1 | 0 | VL3 |
| | 0 | 0 | 1 | 1 | VL4 |

FIG. 11B

| MODE | CMD/ADDR/DATA | | BT1 | | BT0 | | DQ | |
|---|---|---|---|---|---|---|---|---|
| | MSB | LSB | cycle1 | cycle2 | cycle1 | cycle2 | cycle1 | cycle2 |
| NRZ | 1 | 1 | 0 | 0 | 0 | 0 | VL1 | VL1 |
| | 1 | 0 | 0 | 1 | 0 | 1 | VL1 | VL4 |
| | 0 | 1 | 1 | 0 | 1 | 0 | VL4 | VL1 |
| | 0 | 0 | 1 | 1 | 1 | 1 | VL4 | VL4 |

FIG. 14

| MODE | DQ | DT1 | DT2 | DT3 | MSB' | LSB' | CMD, ADDR, DATA |
|---|---|---|---|---|---|---|---|
| PAM-4 | VL1 | 1 | 1 | 1 | 1 | 1 | '11' |
| | VL2 | 0 | 1 | 1 | 1 | 0 | '10' |
| | VL3 | 0 | 0 | 1 | 0 | 1 | '01' |
| | VL4 | 0 | 0 | 0 | 0 | 0 | '00' |
| NRZ | VL1 | 0 | 1 | 0 | 1 | 1 | '1' |
| | VL4 | 0 | 0 | 0 | 0 | 0 | '0' |

MEMORY DEVICE SUPPORTING A HIGH-EFFICIENT INPUT/OUTPUT INTERFACE AND A MEMORY SYSTEM INCLUDING THE MEMORY DEVICE

CROSS-REFERENCE TO RELATED APPLICATIONS

This application is a continuation of U.S. patent application Ser. No. 18/242,034 filed on Sep. 5, 2023, which is a continuation of U.S. patent application Ser. No. 17/903,240 filed on Sep. 6, 2022, now U.S. Pat. No. 11,789,879 which is a continuation of U.S. patent application Ser. No. 17/326,513 filed on May 21, 2021, now U.S. Pat. No. 11,461,251, which claims priority under 35 U.S.C. § 119 to Korean Patent Application No. 10-2020-0134639, filed on Oct. 16, 2020 in the Korean Intellectual Property Office, the disclosures of which are incorporated by reference herein in their entireties.

TECHNICAL FIELD

The inventive concept relates to a memory device, and more particularly, to a memory device supporting a high-efficient input/output interface and a memory system including the memory device.

DISCUSSION OF RELATED ART

Recently, storage devices such as solid state drives (SSDs) have been widely used. SSDs have quick access time and low latency and their cells may contain multiple bits of data. A storage device may include a memory device such as a flash memory and a memory controller for controlling the memory device. The memory device may transceive input/output signals to and from the memory controller via certain pins. For example, the memory device may receive a command, an address, and data from the memory controller in a data input/output signal (DQ) transmitted via a DQ pin. According to this input/output interface, the efficiency thereof may vary according to the transmission time of commands, addresses, and data. Accordingly, to increase the efficiency of the input/output interface between the memory device and the memory controller, a new signaling method for data input/output signals may be employed.

SUMMARY

An embodiment of the inventive concept provides a memory system including: a memory controller configured to transmit a command, an address, or data to a first channel based on a data input/output signal having one of N (N is a natural number of three or more) different voltage levels during a first time interval, the memory controller configured to transmit the command, the address, or the data not transmitted during the first time interval to the first channel based on the data input/output signal having one of two different voltage levels during a second time interval; and a memory device configured to sample the data input/output signal received via the first channel during the first time interval in a pulse amplitude modulation (PAM)-N mode, the memory device configured to sample the data input/output signal received via the first channel during the second time interval in a non return to zero (NRZ) mode.

An embodiment of the inventive concept provides a memory device including: a receiver configured to output M bits (M is a natural number of two or more) corresponding to a voltage level of a data input/output signal received via a data input/output signal pin (DQ pin) based on first through $(N-1)^{th}$ (N is a natural number of three or more) reference voltages in a PAM-N mode, and output one bit corresponding to the voltage level of the data input/output signal based on a certain reference voltage of the first through $(N-1)^{th}$ reference voltages in an NRZ mode; and a control logic circuit configured to control the receiver in the PAM-N mode or the NRZ mode based on a symbol type of the data input/output signal corresponding to one of a command, an address, and data.

An embodiment of the inventive concept provides a memory system including: a memory controller configured to transmit to a first channel a data input/output signal having one of two different voltage levels or the data input/output signal having one of N (N is a natural number of three or more) different voltage levels, according to a symbol type of the data input/output signal corresponding to one of a command, an address, and data; and a memory device configured to sample the data input/output signal in an NRZ mode or a PAM-N mode according to the symbol type of the data input/output signal received via the first channel.

BRIEF DESCRIPTION OF THE DRAWINGS

Embodiments of the inventive concept will be more clearly understood from the following detailed description taken in conjunction with the accompanying drawings in which:

FIG. 9 is a diagram of examples for generating mode signals in FIG. 8;

FIG. 11A illustrates an example operation of the transmitter in FIG. 10 in a PAM-4 mode;

FIG. 11B illustrates an example operation of the transmitter in FIG. 10 in an NRZ mode;

FIG. 14 is a diagram of an example operation of the receiver of FIG. 13;

DETAILED DESCRIPTION OF THE EMBODIMENTS

Hereinafter, embodiments of the inventive concept will be described clearly and in detail so that one of ordinary skill in the art can implement the inventive concept.

Figure 1:
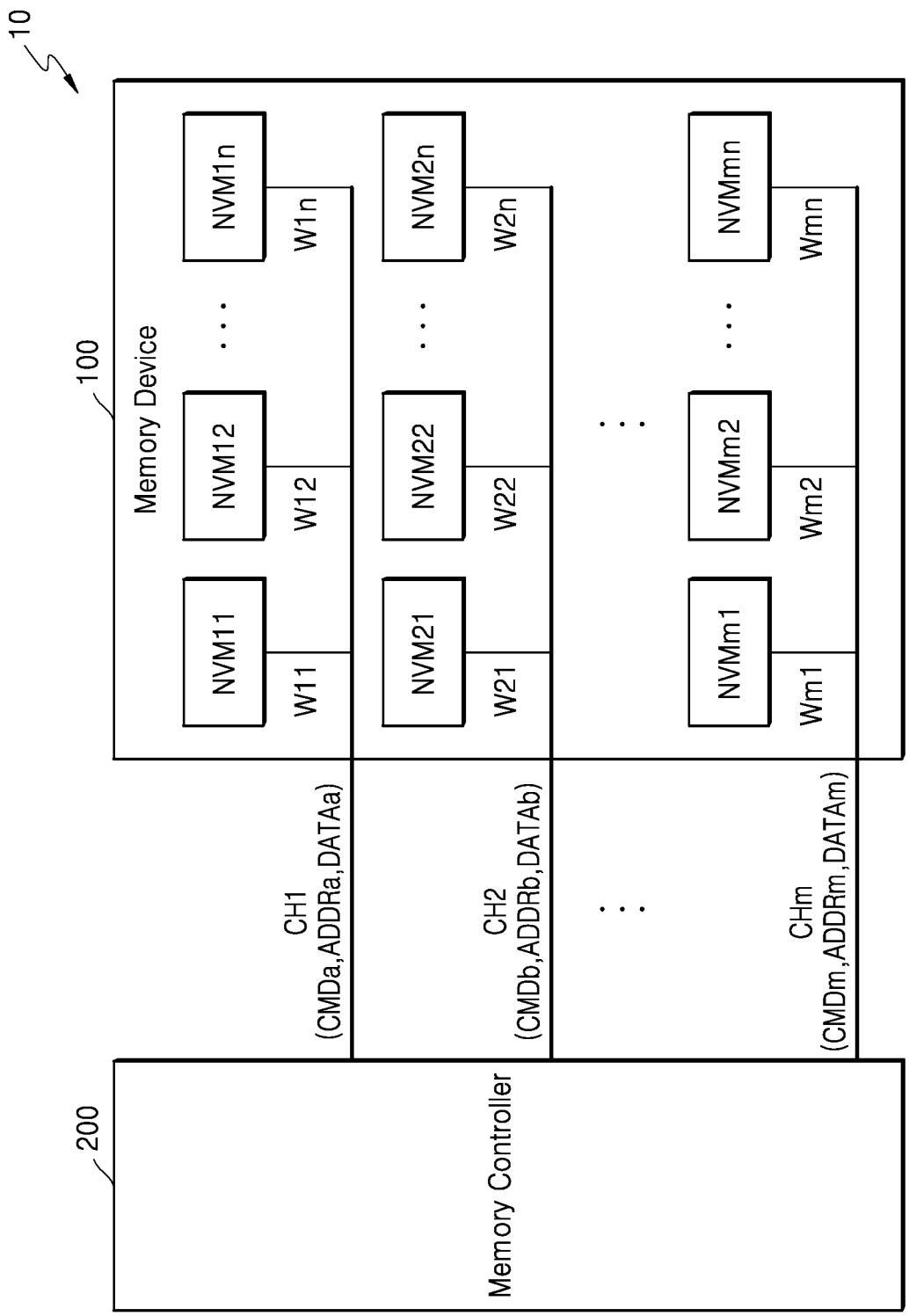
FIG. 1 is a block diagram of a memory system according to an embodiment of the inventive concept.

FIG. 1 is a block diagram of a memory system according to an embodiment of the inventive concept. Referring to FIG. 1, a memory system 10 may include a memory device 100 and a memory controller 200. The memory system 10 may support first through $m^{th}$ channels CH1 through CHm, and the memory device 100 may be connected to the memory controller 200 via the first through $m^{th}$ channels CH1 through CHm. For example, the memory system 10 may be a storage device such as a solid state drive (SSD).

The memory device 100 may include a plurality of memory devices NVM11 through NVMmn. Each of the plurality of memory devices NVM11 through NVMmn may be connected to one of the first through $m^{th}$ channels CH1 through CHm via a corresponding way. For example, memory devices NVM11 through NVM1n may be connected to the first channel CH1 via ways W11 through W1n, memory devices NVM21 through NVM2n may be connected to a second channel CH2 via ways W21 through W2n, and memory devices NVMm1 through NVMmn may be connected to an $m^{th}$ channel CHm via ways Wm1 through Wmn. In an embodiment of the inventive concept, each of the plurality of memory devices NVM11 through NVMmn may be implemented in a memory unit capable of operating according to an individual command from the memory controller 200. For example, each of the plurality of memory devices NVM11 through NVMmn may be a chip or die, but the inventive concept is not limited thereto.

The memory controller 200 may transceive signals to and from the memory device 100 via the first through $m^{th}$ channels CH1 through CHm. For example, the memory controller 200 may transmit commands CMDa through CMDm, addresses ADDRa through ADDRm, and data DATAa through DATAm to the memory device 100 via the first through $m^{th}$ channels CH1 through CHm, or may receive the data DATAa through DATAm from the memory device 100 via the first through $m^{th}$ channels CH1 through CHm.

The memory controller 200 may select one of memory devices connected to a channel, and transceive signals to and from the selected memory device. For example, the memory controller 200 may select the memory device NVM11 of the memory devices NVM11 through NVM1n connected to the first channel CH1. The memory controller 200 may transmit the command CMDa, the address ADDRa, and the data DATAa to the selected memory device NVM11 via the first channel CH1, or may receive the data DATAa from the selected memory device NVM11 via the first channel CH1.

The memory controller 200 may transceive signals to and from the memory device 100 in parallel via different channels. For example, while the memory controller 200 transmits the command CMDa to the memory device 100 via the first channel CH1, the memory controller 200 may transmit the command CMDb to the memory device 100 via the second channel CH2.

The memory controller 200 may control the overall operation of the memory device 100. The memory controller 200 may control each of the plurality of memory devices NVM11 through NVMmn respectively connected to the first through $m^{th}$ channels CH1 through CHm by transmitting signals to the first through $m^{th}$ channels CH1 through CHm. For example, the memory controller 200 may control a selected one of the memory devices NVM11 through NVM1n by transmitting the command CMDa and the address ADDRa to the first channel CH1.

Each of the first through $m^{th}$ channels CH1 through CHm may operate under the control of the memory controller 200. For example, the memory device NVM11 may program the data DATAa according to the command CMDa, the address ADDRa, and the data DATAa provided via the first channel CH1. For example, the memory device NVM21 may read the data DATAb according to the command CMDb and the address ADDRb provided via the second channel CH2, and may transmit the read data DATAb to the memory controller 200 via the second channel CH2.

In FIG. 1, it is illustrated that the memory device 100 communicates with the memory controller 200 via m channels, and the memory device 100 includes n memory devices corresponding to each channel. However, the number of channels and the number of memory devices connected to one channel may be variously changed.

Figure 2:
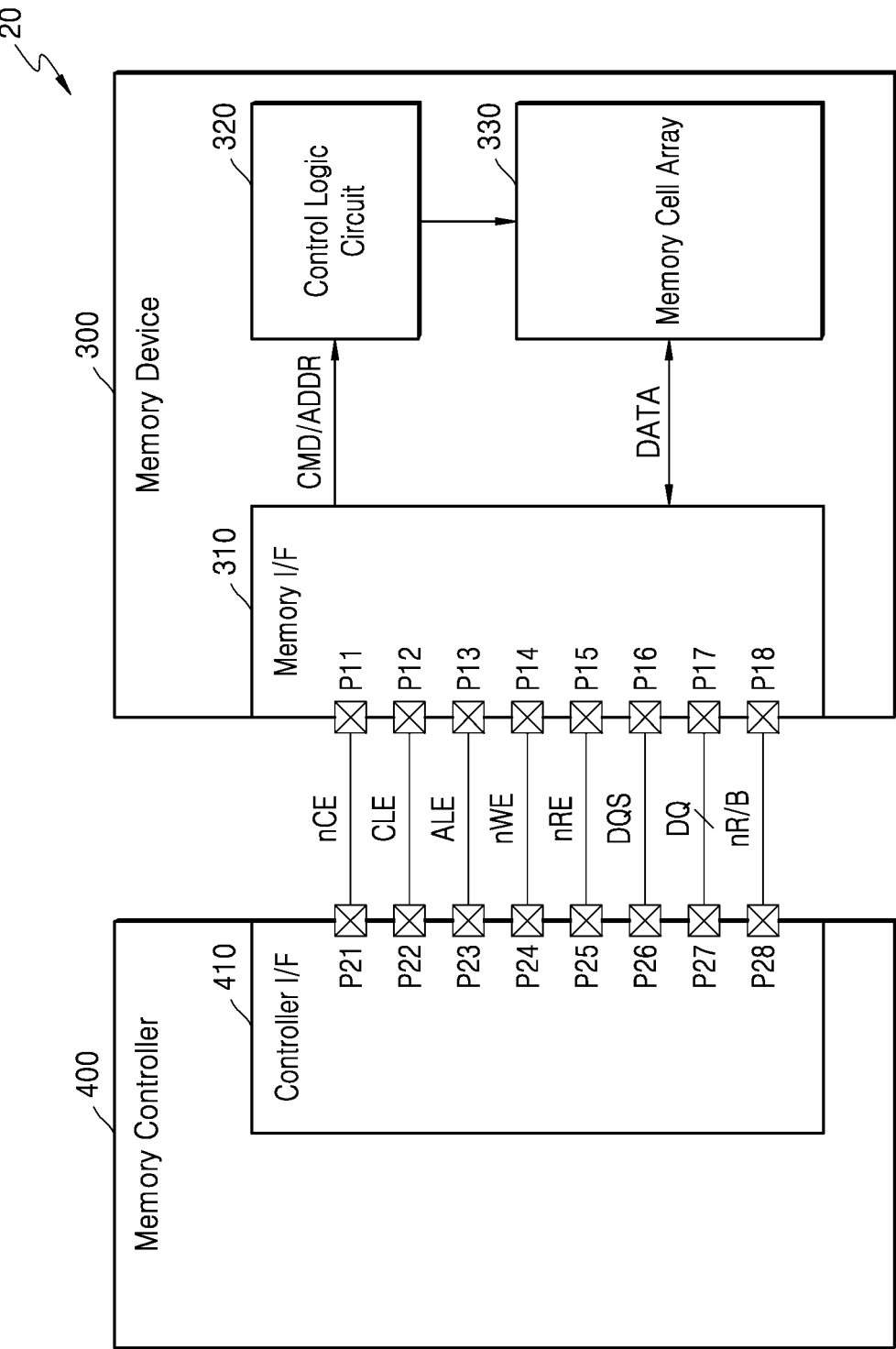
FIG. 2 is a block diagram of a memory system according to an embodiment of the inventive concept.

FIG. 2 is a block diagram of a memory system according to an embodiment of the inventive concept. Referring to FIG. 2, a memory system 20 may include a memory device 300 and a memory controller 400. The memory device 300 may correspond to one of the plurality of memory devices NVM11 through NVMmn communicating with the memory controller 200 through one of the first through $m^{th}$ channels CH1 through CHm in FIG. 1. The memory controller 400 may correspond to the memory controller 200 in FIG. 1.

The memory device 300 may include first through eighth pins P11 through P18, a memory interface circuit (I/F) 310, a control logic circuit 320, and a memory cell array 330.

The memory I/F 310 may receive a chip enable signal nCE from the memory controller 400 via the first pin P11. The memory I/F 310 may transceive signals to and from the memory controller 400 via the second through eighth pins P12 through P18 according to the chip enable signal nCE. For example, when the chip enable signal nCE is in an enable state (for example, a low level), the memory I/F 310 may transceive signals to and from the memory controller 400 via the second through eighth pins P12 through P18.

The memory I/F 310 may receive a command latch enable signal CLE, an address latch enable signal ALE, and a write enable signal nWE from the memory controller 400 via the second through fourth pins P12 through P14. The memory I/F 310 may receive a data input/output signal DQ from the memory controller 400 via the seventh pin P17, or may transmit the data input/output signal DQ to the memory controller 400 via the seventh pin P17. A command CMD, an address ADDR, and data DATA may be transmitted by using the data input/output signal DQ. For example, the data input/output signal DQ may be transmitted via a plurality of signal lines. In this case, the seventh pin P17 may include a plurality of pins corresponding to a plurality of data input/output signals DQ.

The memory I/F 310 may obtain the command CMD from the data input/output signal DQ that is received during an enable period (for example, a high level state) of the command latch enable signal CLE, based on toggle timings of the write enable signal nWE. The memory I/F 310 may obtain the address ADDR from the data input/output signal DQ that is received during the enable period (for example, a high level state) of the address latch enable signal ALE, based on toggle timings of the write enable signal nWE.

In an embodiment of the inventive concept, the write enable signal nWE may maintain a toggle-off state (for example, a high level or a low level state), and then, may toggle between the high level state and the low level state. For example, the write enable signal nWE may be toggled in a period in which the command CMD or the address ADDR is transmitted. Accordingly, the memory I/F 310 may obtain the command CMD or the address ADDR based on toggle timings of the write enable signal nWE.

The memory I/F 310 may receive a read enable signal nRE from the memory controller 400 via the fifth pin P15. The memory I/F 310 may receive a data strobe signal DQS from the memory controller 400 via the sixth pin P16 or may transmit the data strobe signal DQS to the memory controller 400 via the sixth pin P16.

In the data DATA output operation of the memory device 300, the memory I/F 310 may receive the read enable signal nRE that toggles via the fifth pin P15, before outputting the data DATA. The memory I/F 310 may generate the data strobe signal DQS that toggles in response to toggling of the read enable signal nRE. The memory I/F 310 may transmit the data input/output signal DQ including the data based on a toggle timing of the data strobe signal DQS. Accordingly, the data DATA may be aligned with the toggle timing of the data strobe signal DQS and transmitted to the memory controller 400.

In a data input operation of the memory device 300, when the data input/output signal DQ including the data DATA is received from the memory controller 400, the memory I/F 310 may receive from the memory controller 400 the data strobe signal DQS toggling together with the data DATA. The memory I/F 310 may obtain the data DATA from the data input/output signal DQ based on the toggle timing of the data strobe signal DQS. For example, the memory I/F 310 may obtain the data DATA by sampling the data input/output signal DQ at rising and falling edges of the data strobe signal DQS.

The memory I/F 310 may transmit a ready/busy output signal nR/B to the memory controller 400 via the eighth pin P18. The memory I/F 310 may transmit state information of the memory device 300 to the memory controller 400 via the ready/busy output signal nR/B. When the memory device 300 is in a busy state (e.g., when internal operations of the memory device 300 are being performed), the memory I/F 310 may transmit the ready/busy output signal nR/B indicating a busy state to the memory controller 400. When the memory device 300 is in a ready state (e.g., when internal operations of the memory device 300 are not performed or are completed), the memory I/F 310 may transmit the ready/busy output signal nR/B indicating a ready state to the memory controller 400.

The control logic circuit 320 may control various operations of the memory device 300. The control logic circuit 320 may generate control signals for controlling other components of the memory device 300 according to a command and/or address CMD/ADDR obtained from the memory I/F 310. For example, the control logic circuit 320 may generate various control signals for programming the data DATA into the memory cell array 330, or reading the data DATA from the memory cell array 330.

The memory cell array 330 may store the data DATA obtained from the memory I/F 310 under the control of the control logic circuit 320. The memory cell array 330 may output the stored data DATA to the memory I/F 310 under the control of the control logic circuit 320.

The memory cell array 330 may include the plurality of memory cells. For example, the plurality of memory cells may include flash memory cells. However, the inventive concept is not limited thereto, and the memory cells may include resistive random access memory (RAM) (RRAM) cells, ferroelectric RAM (FRAM) cells, phase change RAM (PRAM) cells, thyristor RAM (TRAM) cells, magnetic RAM (MRAM) cells, and dynamic RAM (DRAM) cells. Hereinafter, embodiments of the inventive concept will be described focusing on an example in which the memory cells include NAND flash memory cells.

The memory controller 400 may include first through eighth pins P21 through P28, and a controller interface circuit (I/F) 410. The first through eighth pins P21 through P28 may correspond to the first through eighth pins P11 through P18 of the memory device 300, respectively. In other words, the first pin P21 may be connected to the first pin P11 and the eighth pin P28 may be connected to the eighth pin P18.

The controller I/F 410 may transmit the chip enable signal nCE to the memory device 300 via the first pin P21. The controller I/F 410 may transceive signals to and from the memory device 300 selected by using the chip enable signal nCE via the second through eighth pins P22 through P28.

The controller I/F 410 may transmit the command latch enable signal CLE, the address latch enable signal ALE, and the write enable signal nWE to the memory device 300 via the second through fourth pins P22 through P24. The controller I/F 410 may transmit the data input/output signal DQ to the memory device 300 via the seventh pin P27, or may receive the data input/output signal DQ from the memory device 300. The seventh pin P27 may include a plurality of pins corresponding to a plurality of data input/output signals DQ.

The controller I/F 410 may transmit the data input/output signal DQ including the command CMD or the address ADDR to the memory device 300 together with the toggling write enable signal nWE. In other words, while the write enable signal nWE is toggled, the data input/output signal DQ including the command CMD or the address ADDR may be transmitted to the memory device 300. The controller I/F 410 may transmit, to the memory device 300, the data input/output signal DQ including the command CMD to the memory device 300 as the command latch enable signal CLE in an enable state is transmitted, and may transmit the data input/output signal DQ including the address to the memory device 300 as the address latch enable signal ALE is transmitted.

The controller I/F 410 may transmit the read enable signal nRE to the memory device 300 via the fifth pin P25. The controller I/F 410 may receive the data strobe signal DQS from the memory device 300 via the sixth pin P26, or may transmit the data strobe signal DQS to the memory device 300.

In the data (DATA) output operation of the memory device 300, the controller I/F 410 may toggle the read enable signal nRE, and transmit the read enable signal nRE to the memory device 300. For example, the controller I/F 410 may generate the read enable signal nRE that is changed from a toggle-off state (for example, a high level state or a low level state) to a toggle state before the data DATA is output. Accordingly, the memory device 300 may generate the data strobe signal DQS that toggles in response to the read enable signal nRE. The controller I/F 410 may receive the data input/output signal DQ including the data DATA together with the toggling data strobe signal DQS from the memory device 300. In other words, while the data strobe signal DQS is toggled, the controller I/F 410 may receive the data input/output signal DQ including the data DATA from the memory device 300. The controller I/F 410 may obtain the data DATA from the data input/output signal DQ based on the toggle timing of the data strobe signal DQS.

In the data DATA input operation of the memory device 300, the controller I/F 410 may generate the toggling data strobe signal DQS. For example, the controller I/F 410 may generate the data strobe signal DQS that is changed from a toggle-off state (for example, a high level state or a low level state) to a toggle state before transmitting the data DATA. The controller I/F 410 may transmit the data input/output signal DQ including the data DATA to the memory device 300 based on the toggle timing of the data strobe signal DQS.

The controller I/F 410 may receive the ready/busy output signal nR/B from the memory device 300 via the eighth pin P28. The controller I/F 410 may determine state information of the memory device 300 based on the ready/busy output signal nR/B.

Figure 3:
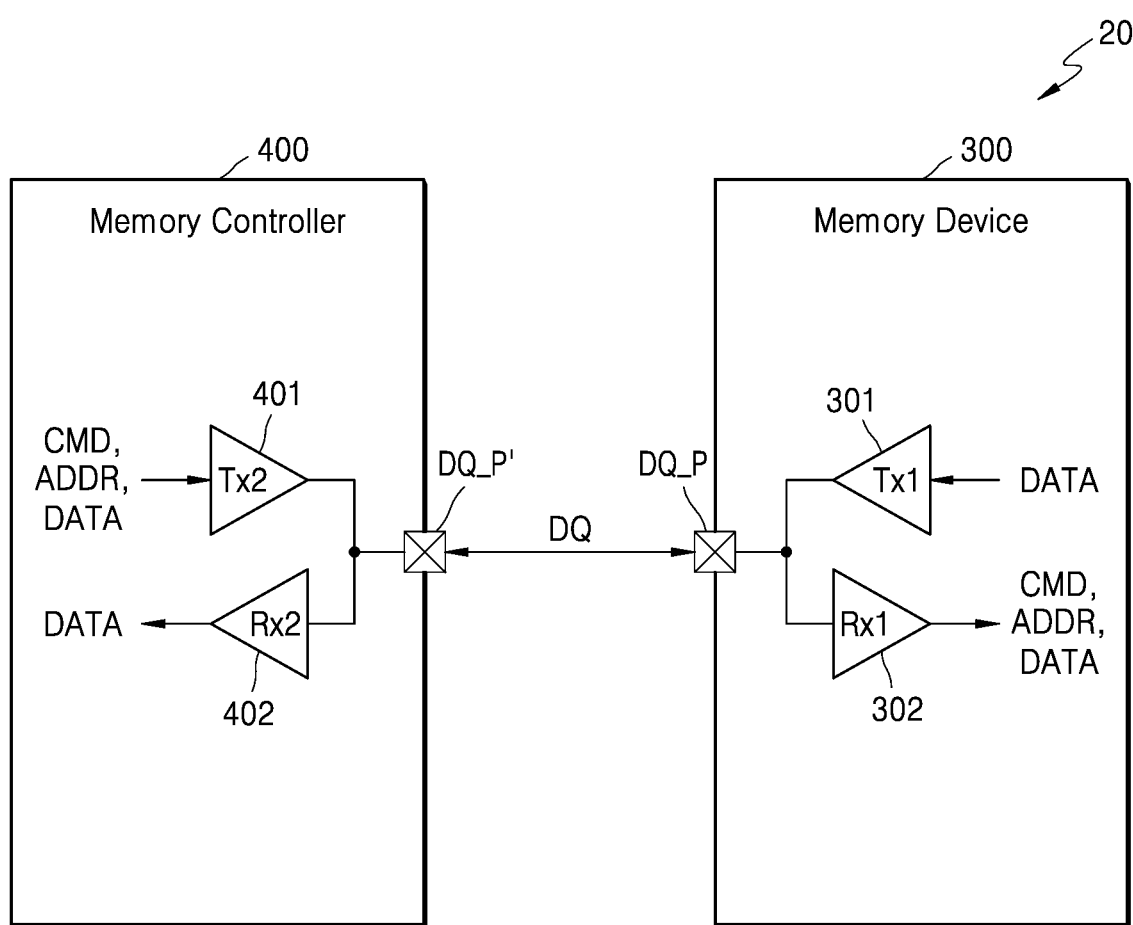
FIG. 3 illustrates the memory system of FIG. 2 for exchanging data input/output signals, according to an embodiment of the inventive concept.

FIG. 3 illustrates the memory system 20 of FIG. 2 for exchanging data input/output signals, according to an embodiment of the inventive concept. Referring to FIG. 3, the memory device 300 may include a DQ pin DQ_P, a first transmitter (Tx1) 301, and a first receiver (Rx1) 302. The DQ pin DQ_P may correspond to the seventh pin P17 in FIG. 2. For example, when the seventh pin P17 includes a plurality of pins, the DQ pin DQ_P may correspond to one of the plurality of pins.

The Tx1 301 may generate the data input/output signal DQ based on the data DATA, and transmit the data input/output signal DQ to the memory controller 400 via the DQ pin DQ_P. In an embodiment of the inventive concept, the Tx1 301 may generate the data input/output signal DQ by using an N-level pulse amplitude modulation (hereinafter, referred to as pulse amplitude modulation (PAM)-N) (N is a natural number of 3 or more) method, or a 2-level PAM (hereinafter, referred to as a non return to zero (NRZ)) method based on the data DATA. For example, the Tx1 301 may use one of PAM-4, PAM-8, and PAM-16 methods.

A PAM-N method may be a modulation method for transmitting a plurality of bits during one unit interval, and the NRZ method may be a modulation method for transmitting one bit during one unit interval. In this case, the unit interval may correspond to a symbol period for transmitting one symbol of the data input/output signal DQ. For example, when the data DATA is modulated by the PAM-N method, one symbol may include a plurality of data bits. When the data DATA is modulated in the NRZ method, one symbol may include one data bit.

The Rx1 302 may receive the data input/output signal DQ from the memory controller 400 via the DQ pin DQ_P, and obtain the command CMD, the address ADDR, or the data DATA from the data input/output signal DQ. In an embodiment of the inventive concept, the Rx1 302 may sample the received data input/output signal DQ in the PAM-N mode or the NRZ mode, and obtain the command CMD, the address ADDR, or the data DATA. For example, in the PAM-N mode, the Rx1 302 may output the plurality of bits based on the voltage level of the data input/output signal DQ received during one unit interval. In the NRZ mode, the Rx1 302 may output one bit based on the voltage level of the data input/output signal DQ received during one unit interval.

In an embodiment of the inventive concept, the mode of the Rx1 302 may vary according to a symbol type of the received data input/output signal DQ. In other words, the mode of the Rx1 302 may vary depending on whether the command CMD is received via the data input/output signal DQ, the address ADDR is received, or the data DATA is received. For example, when the command CMD and the address ADDR are received, the Rx1 302 may operate in the PAM-N mode, and when the data DATA is received, the Rx1 302 may operate in the NRZ mode.

The memory controller 400 may include a DQ pin DQ_P', a second transmitter (Tx2) 401, and a second receiver (Rx2) 402. The DQ pin DQ_P' may correspond to the DQ pin DQ_P of the memory device 300. In other words, the DQ pin DQ_P' and the DQ pin DQ_P may be connected to each other. When the seventh pin P27 includes a plurality of pins, the DQ pin DQ_P' may correspond to one of the plurality of pins.

The Tx2 401 may generate a data input/output signal DQ based on the command CMD, the address ADDR, and the data DATA, and transmit the data input/output signal DQ to the memory device 300 via the DQ pin DQ_P'. In an embodiment of the inventive concept, the Tx2 401 may generate the data input/output signal DQ by the PAM-N method or the NRZ method based on the command CMD, the address ADDR, and the data DATA. The modulation method of the data input/output signal DQ may vary depending on the symbol type to be included in the data input/output signal DQ. In other words, the modulation method may vary depending on whether the command CMD is transmitted, the address ADDR is transmitted, or the data DATA is transmitted via the data input/output signal DQ. For example, the Tx2 401 may transmit the command CMD and the address ADDR by the PAM-N method, and transmit the data DATA by the NRZ method.

The Rx2 402 may receive the data input/output signal DQ from the memory device 300 via the DQ pin DQ_P', and obtain the data DATA from the data input/output signal DQ. In an embodiment of the inventive concept, the Rx2 402 may obtain the data DATA by sampling the received data input/output signal DQ in the PAM-N mode or the NRZ mode. For example, in the PAM-N mode, the Rx2 402 may output the plurality of data bits based on the voltage level of the data input/output signal DQ received during one unit interval. In the NRZ mode, the Rx2 402 may output one data bit based on the voltage level of the data input/output signal DQ received during one unit interval.

In an embodiment of the inventive concept, the modulation method of the data input/output signal DQ may be determined according to a certain convention. In this case, the modes of the Rx1 302 and the Rx2 402 for sampling the data input/output signal DQ may be determined to correspond to the modulation methods of the Tx1 301 and the Tx2 401 according to a certain convention. In another embodiment of the inventive concept, the memory controller 400 may transmit signaling information about a modulation method of the data input/output signal DQ to the memory device 300. The memory device 300 may determine a modulation method of the Tx1 301 and a mode of the Rx1 302 based on signaling information received from the memory controller 400.

Figure 4A:
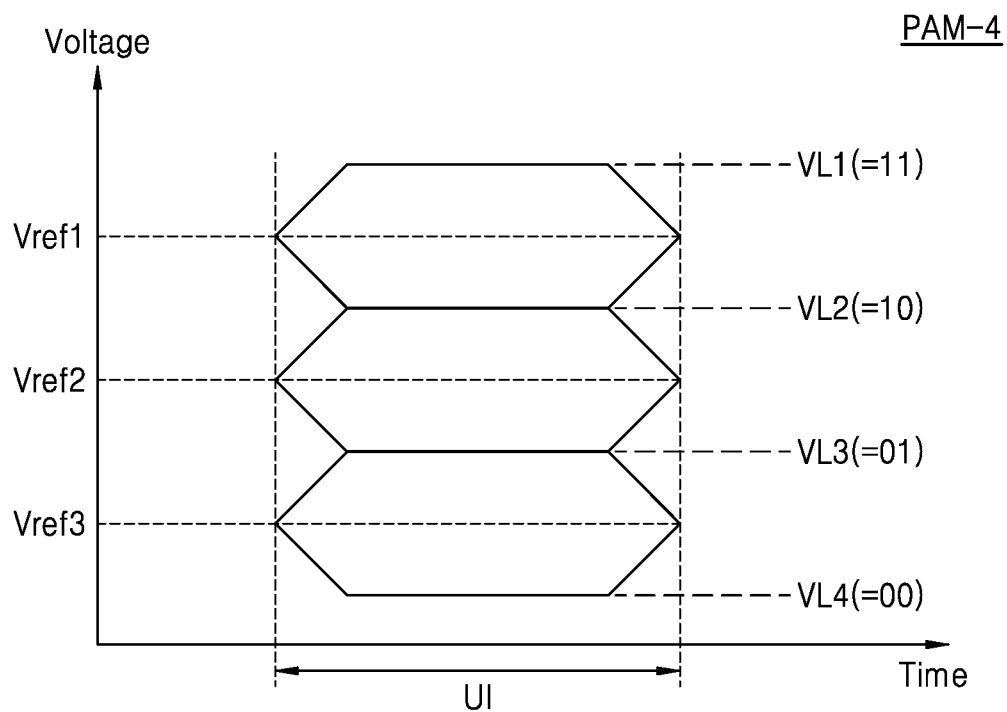
FIG. 4A is a graph illustrating an example of a data eye for describing a four-level pulse amplitude modulation (PAM-4) method of the data input/output signals, according to an embodiment of the inventive concept.
Figure 4B:
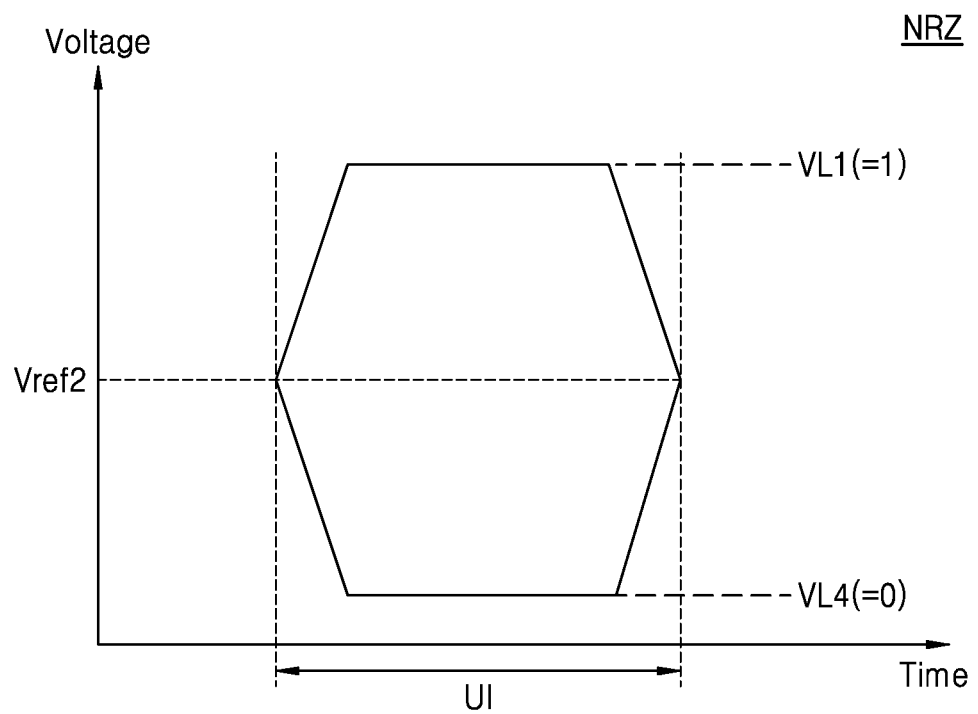
FIG. 4B is a graph illustrating an example of a data eye for describing a non-return to zero modulation (NRZ) method of the data I/O signals, according to an embodiment of the inventive concept.

FIG. 4A is a graph illustrating an example of a data eye for describing the PAM-4 method of the data input/output signal DQ, according to an embodiment of the inventive concept. FIG. 4B is a graph illustrating an example of a data eye for describing the NRZ method of the data input/output signal DQ, according to an embodiment of the inventive concept. The horizontal axes of the graphs of FIGS. 4A and 4B may denote time, and the vertical axes thereof may denote voltage levels.

Referring to FIGS. 3 and 4A, the data input/output signal DQ may be transmitted between the memory device 300 and the memory controller 400 by the PAM-4 method. In this case, the data input/output signal DQ may be generated to have one of first through fourth voltage levels VL1 through VL4. Accordingly, two bits (for example, one of '11', '10', '01', and '00') during one unit interval UI may be transmitted between the memory device 300 and the memory controller 400 via the data input/output signal DQ. For example, bits '11' may correspond to the first voltage level VL1, bits '10' may correspond to the second voltage level VL2, bits '01' may correspond to the third voltage level VL3, and bits '00' may correspond to the fourth voltage level VL4. In other words, during the unit interval UI, a symbol having one of the first through fourth voltage levels VL1 through VL4 may be generated, and each of the symbols may correspond to two bits.

The data input/output signal DQ transmitted by the PAM-4 method may be sampled based on first through third reference voltages Vref1 through Vref3. For example, when the voltage level of the data input/output signal DQ is greater than the first reference voltage Vref1, the data input/output signal DQ may be decoded into bits '11'. When the voltage level of the data input/output signal DQ is less than the first reference voltage Vref1 and greater than the second reference voltage Vref2, the data input/output signal DQ may be decoded into bits '10'. When the voltage level of the data input/output signal DQ is less than the second reference voltage Vref2 and greater than the third reference voltage Vref3, the data input/output signal DQ may be decoded into bits '01'. When the voltage level of the data input/output signal DQ is less than the third reference voltage Vref3, the data input/output signal DQ may be decoded into bits '00'.

For example, when the memory controller 400 transmits the command CMD to the memory device 300 by the PAM-4 method, the Tx2 401 may transmit the data input/output signal DQ having a voltage level corresponding to the two bits of the command CMD of the first through fourth voltage levels VL1 through VL4 to the memory device 300 during one unit interval UI. The Rx1 302 may compare the voltage level of the data input/output signal DQ to each of the first through third reference voltages Vref1 through Vref3 in the PAM-4 mode, and obtain two bits corresponding to the data input/output signal DQ. In other words, the Rx1 302 may determine the bits corresponding to the data input/output signal DQ.

Referring to FIGS. 3 and 4B, the data input/output signal DQ may be transmitted between the memory device 300 and the memory controller 400 by the NRZ method. In this case, the data input/output signal DQ may be generated to have one of the first and fourth voltage levels VL1 and VL4. The first voltage level VL1 of the NRZ method may correspond to the first voltage level VL1 of the PAM-4 method, and the fourth voltage level VL4 of the NRZ method may correspond to the fourth voltage level VL4 of the PAM-4 method. Accordingly, one bit (for example, one of '1' and '0') may be transmitted via the data input/output signal DQ during one unit interval UI between the memory device 300 and the memory controller 400. For example, the bit '1' may correspond to the first voltage level VL1, and the bit '0' may correspond to the fourth voltage level VL4. In other words, during the unit interval UI, a symbol having one of the first and fourth voltage levels VL1 and VL4 may be generated, and each of the symbols may correspond to one bit.

The data input/output signal DQ transmitted by the NRZ method may be sampled based on the second reference voltage Vref2. The second reference voltage Vref2 of the NRZ method may correspond to the second reference voltage Vref2 in FIG. 4A. For example, when the voltage level of the data input/output signal DQ is greater than the second reference voltage Vref2, the data input/output signal DQ may be decoded into the bit '1'. When the voltage level of the data input/output signal DQ is less than the second reference voltage Vref2, the data input/output signal DQ may be decoded into the bit '0'.

For example, when the memory controller 400 transmits the data DATA to the memory device 300 by the NRZ method, the Tx2 401 may transmit the data input/output signal DQ having a voltage level corresponding to one bit of the data DATA of the first and fourth voltage levels VL1 and VL4 to the memory device 300 during the unit interval UI. The Rx1 302 may obtain one bit corresponding to the data input/output signal DQ by comparing the voltage level of the data input/output signal DQ to the second reference voltage Vref2 in the NRZ mode. In other words, the Rx1 302 may determine the one bit corresponding to the data input/output signal DQ.

In FIG. 4B, a reference voltage for sampling the data input/output signal DQ in the NRZ mode is illustrated as the second reference voltage Vref2, but the inventive concept is not limited thereto. For example, various voltages (for example, the first reference voltage Vref1 or the third reference voltage Vref3 in FIG. 4A) may be used as a reference voltage for sampling the data input/output signal DQ in the NRZ mode.

With respect to FIGS. 4A and 4B, for convenience of description, the PAM-4 method has been described, but the inventive concept is not limited thereto. For example, when the data input/output signal DQ is transmitted between the memory device 300 and the memory controller 400 by the PAM-N method, the data input/output signal DQ may be generated to have one of the first through $N^{th}$ voltage levels, for example, first through eighth voltage levels. Accordingly, M bits (M is a natural number of 2 or more) may be transmitted between the memory device 300 and the memory controller 400 during the unit interval UI via the data input/output signal DQ. For example, when the data input/output signal DQ is transmitted by a PAM-8 method, 3 bits may be transmitted during the unit interval UI, and when the data input/output signal DQ is transmitted by a PAM-16 method, 4 bits may be transmitted during the unit interval UI. In other words, N may be an M power of 2. In this case, the data input/output signal DQ transmitted by the PAM-N method may be sampled based on the first through $(N-1)^{th}$ reference voltages.

FIGS. 5A through 5D illustrate signaling methods of the data input/output signal DQ, according to embodiments of the inventive concept. The memory device 300 and the memory controller 400 in FIG. 3 (for example, the first and second transmitters 301 and 401 and the first and second receivers 302 and 402) may generate the data input/output signal DQ and sample the data input/output signal DQ, based on the signaling methods illustrated in FIGS. 5A through 5D.

Figure 5A:
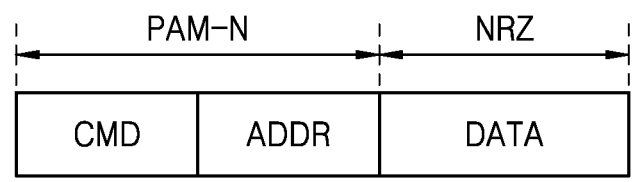
FIGS. 5A, 5B, 5C and 5D illustrate signaling methods of the data I/O signals, according to an embodiment of the inventive concept.

Referring to FIGS. 3 and 5A, the command CMD and the address ADDR may be transmitted by the PAM-N method, and the data DATA may be transmitted by the NRZ method. For example, the memory controller 400 may transmit the command CMD and the address ADDR to the memory device 300 by the PAM-N method, and transmit the data DATA corresponding to the command CMD by the NRZ method. In this case, the memory device 300 may obtain the command CMD and the address ADDR in the PAM-N mode, and obtain the data DATA in the NRZ mode. In FIG. 5A, the PAM-N mode may occur before the NRZ mode.

Figure 5B:
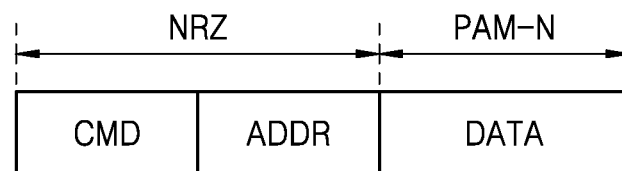

Referring to FIGS. 3 and 5B, the command CMD and the address ADDR may be transmitted by the NRZ method, and the data DATA may be transmitted by the PAM-N method. For example, the memory controller 400 may transmit the command CMD and the address ADDR to the memory device 300 by the NRZ method, and transmit the data DATA corresponding to the command CMD by the PAM-N method. In this case, the memory device 300 may obtain the command CMD and the address ADDR in the NRZ mode, and obtain the data DATA in the PAM-N mode. In FIG. 5B, the NRZ mode may occur before the PAM-N mode.

Figure 5C:
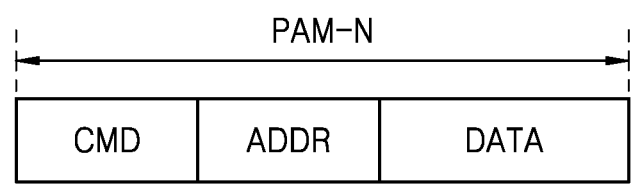

Referring to FIGS. 3 and 5C, the command CMD, the address ADDR, and the data DATA may be transmitted by the PAM-N method. For example, the memory controller 400 may transmit the command CMD, the address ADDR, and the data DATA corresponding to the command CMD to the memory device 300 by the PAM-N method. In this case, the memory device 300 may obtain the command CMD, the address ADDR, and the data DATA in the PAM-N mode.

Figure 5D:
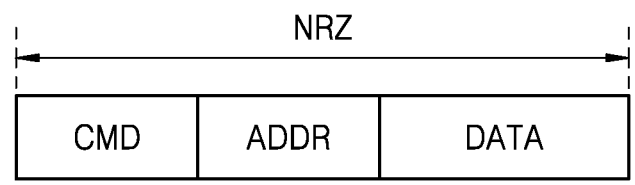

Referring to FIGS. 3 and 5D, the command CMD, the address ADDR, and the data DATA may be transmitted by the NRZ method. The memory controller 400 may transmit the command CMD, the address ADDR, and the data DATA corresponding to the command CMD to the memory device 300 by the NRZ method. In this case, the memory device 300 may obtain the command CMD, the address ADDR, and the data DATA in the NRZ mode.

As described above, the memory device 300 and the memory controller 400 may exchange the data input/output signal DQ based on the PAM-N and NRZ modes. For example, as illustrated in FIG. 5A, when the data input/output signal DQ corresponding to at least one of the command CMD, the address ADDR, and the data DATA is transmitted in the PAM-N mode, the data input/output signal DQ corresponding to the rest of the command CMD, the address ADDR, and the data DATA may be transmitted in the NRZ mode. As illustrated in FIG. 5B, when the data input/output signal DQ corresponding to at least one of the command CMD, the address ADDR, and the data DATA is transmitted in the NRZ mode, the data input/output signal DQ corresponding to the rest of the command CMD, the address ADDR, and the data DATA may be transmitted in the PAM-N mode.

According to the modulation method of FIG. 5A, the transmission time of the command CMD and the address ADDR may be reduced compared to the modulation method of FIG. 5D. In this case, ratios of the command CMD and the address ADDR transmission time to the data DATA transmission time may be reduced. Accordingly, the ratio of the data DATA transmission time to the total transmission time of the command CMD, the address ADDR, and the data DATA may be increased, and the input/output efficiency of the memory system 20 may be increased. In addition, when the command CMD and the address ADDR transmission time is reduced, as illustrated in FIG. 1, the interleave operation time for n memory devices connected to one channel may be reduced.

According to the modulation methods of FIGS. 5B and 5C, more bits of data DATA may be transmitted during a unit time compared to the modulation method of FIG. 5D. Accordingly, the data bandwidth of the memory device 300 may be increased. In addition, the modulation method of FIG. 5B may increase the transmission time of the command CMD and the address ADDR compared to the modulation method of FIG. 5C, but the reliability of the command CMD and the address ADDR provided to the memory device 300 may be increased by the modulation method of FIG. 5B. According to the modulation method of FIG. 5D, the memory device 300 may exchange the data input/output signal DQ with a memory controller that does not support the PAM-N method. In other words, the memory device 300 may be used by a memory controller that supports the PAM-N mode or a memory controller that does not support the PAM-N mode.

Hereinafter, for convenience of description, embodiments of the inventive concept will be described in which the data input/output signal DQ is transmitted by one of the PAM-N method and the NRZ method based on the embodiment of FIG. 5A, and the memory device 300 and the memory controller 400 perform the sampling of the data input/output signal DQ in one of the PAM-N mode and the NRZ mode. However, the inventive concept is not limited thereto, and the following embodiments may be applied to the embodiments of FIGS. 5B through 5D.

Figure 6:
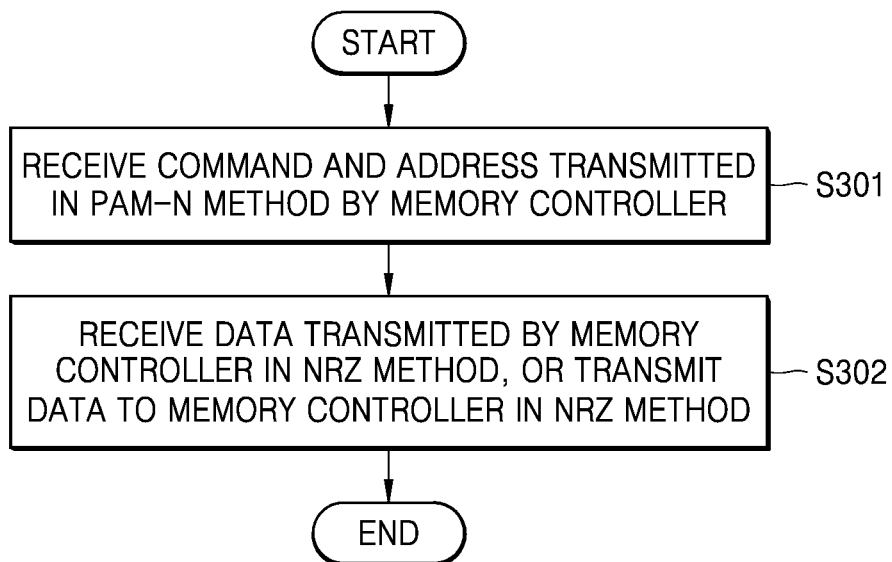
FIG. 6 is a flowchart of an example operation of the memory device in FIG. 3, according to the signaling method of FIG. 5A.

FIG. 6 is a flowchart of an example operation of the memory device 300 in FIG. 3, according to the signaling method of FIG. 5A. Referring to FIGS. 3 and 6, the memory device 300 may receive the command CMD and the address ADDR transmitted by the memory controller 400 by the PAM-N method (S301). For example, the memory device 300 may receive the command CMD and the address ADDR from the memory controller 400 based on the data input/output signal DQ having one of N different voltage levels. In this case, the memory device 300 may obtain the command CMD and the address ADDR corresponding to the voltage level of the data input/output signal DQ based on the first through $(N-1)^{th}$ reference voltages in the PAM-N mode.

The memory device 300 may receive the data DATA transmitted by the memory controller 400 by the NRZ method or transmit the data DATA to the memory controller 400 by the NRZ method (S302). For example, the memory device 300 may receive data DATA corresponding to the command CMD (for example, a program command) based on the data input/output signal DQ having one of two different voltage levels from the memory controller 400. Alternatively, the memory device 300 may transmit the data DATA corresponding to the command CMD (for example, a read command) based on the data input/output signal DQ having one of two different voltage levels to the memory controller 400. In this case, the memory device 300 may obtain the data DATA corresponding to the voltage level of the data input/output signal DQ based on one reference voltage in the NRZ mode.

Figure 7A:
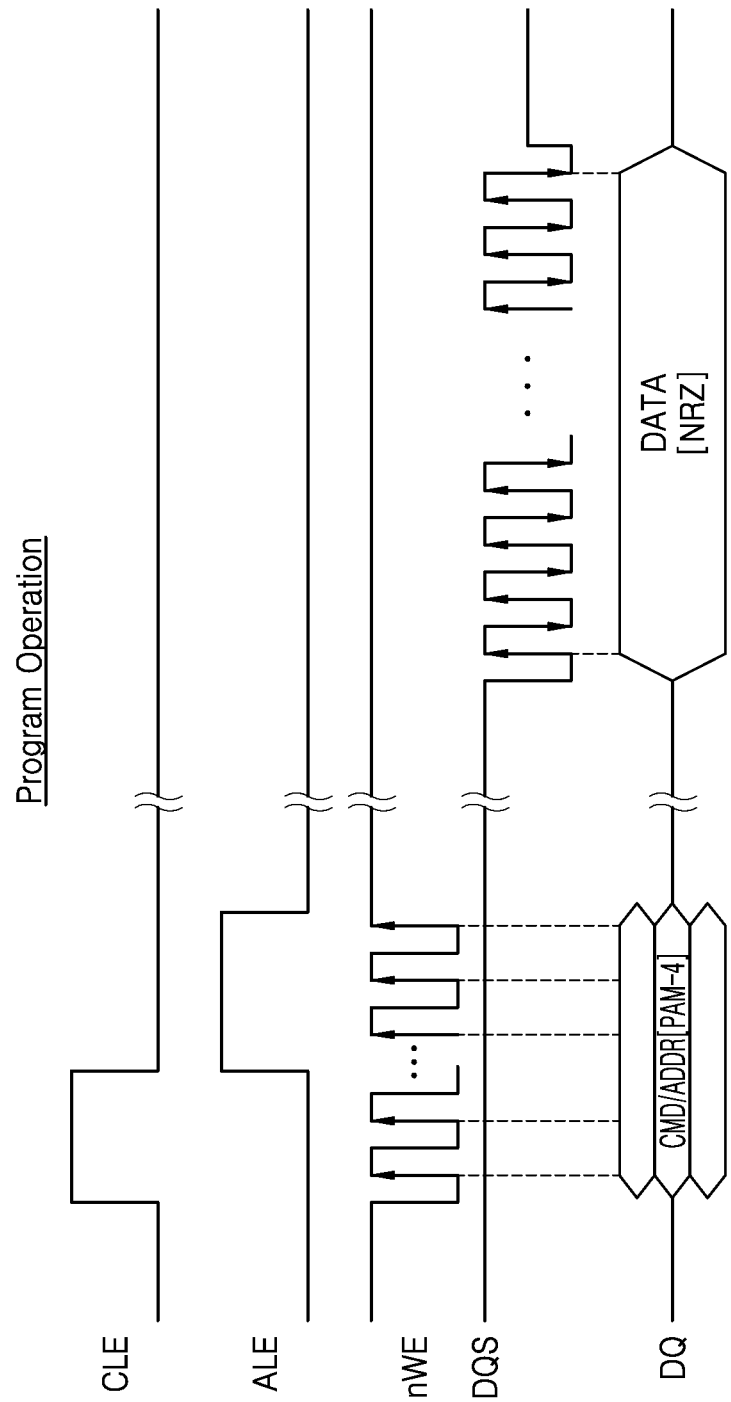
FIG. 7A is an example timing diagram for a program operation, according to the embodiment of FIG. 5A.
Figure 7B:
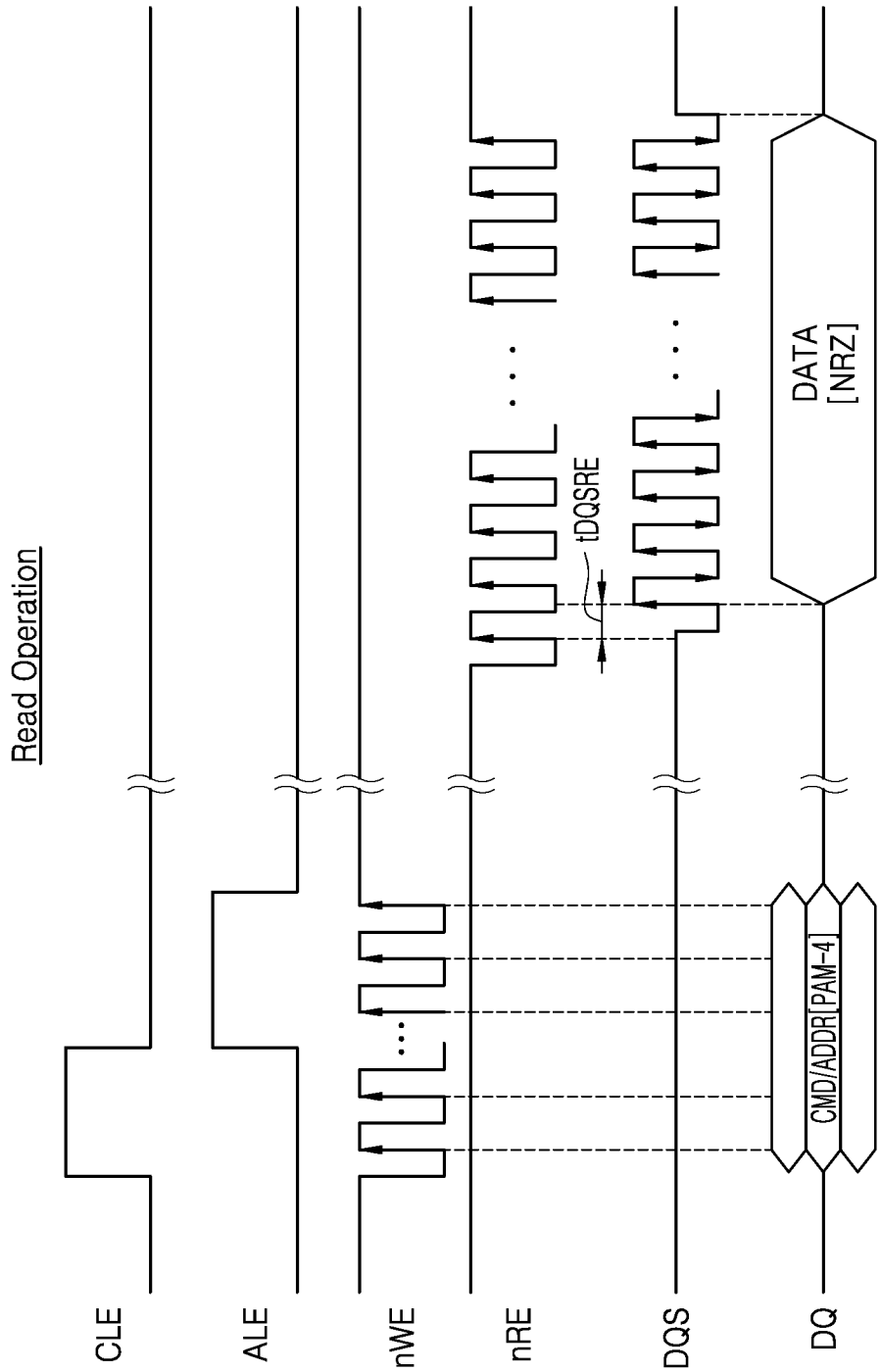
FIG. 7B is an example timing diagram for a read operation, according to the embodiment of FIG. 5A.

FIG. 7A is an example timing diagram for a program operation, according to the embodiment of FIG. 5A. FIG. 7B is an example timing diagram for a read operation, according to the embodiment of FIG. 5A. FIG. 7A illustrates an example in which the memory device 300 receives the command CMD, the address ADDR, and the data DATA from the memory controller 400 for the program operation, and FIG. 7B illustrates an example in which the memory device 300 receives the command CMD and the address ADDR from the memory controller 400 for the read operation, and transmits the data DATA to the memory controller 400.

Referring to FIGS. 7A and 7B, the memory device 300 may receive the write enable signal nWE in a toggle state from the memory controller 400. The memory device 300 may receive the command CMD and the address ADDR from the memory controller 400 during the interval in which the write enable signal nWE is in a toggle state. In other words, the time period in which the command CMD and the address ADDR are received may overlap with the time period in which the write enable signal nWE toggles. The command CMD may be transmitted via the data input/output signal DQ during the enable interval of the command latch enable signal CLE (for example, in a high level state), and the address ADDR may be transmitted via the data input/output signal DQ in the enable interval (for example, a high level state) of the address latch enable signal ALE. In this case, the memory device 300 may receive the command CMD and the address ADDR via the data input/output signal DQ transmitted by the PAM-4 method. For example, a program command may be transmitted in the program operation, and a read command may be transmitted in the read operation.

Referring to FIG. 7A, the memory device 300 may receive a data strobe signal DQS in a toggle state from the memory controller 400. The data strobe DQS may be toggled after the write enable signal nWE is toggled. The memory device 300 may receive data DATA from the memory controller 400 in the interval in which the data strobe signal DQS is in a toggle state. In this case, the memory device 300 may receive the data DATA via the data input/output signal DQ transmitted in the NRZ method.

In the program operation, the memory device 300 may program the data DATA into the memory cell array 330 in FIG. 2 in response to the program command. While a program is being executed, as described with reference to FIG. 2, the memory device 300 may transmit the ready/busy output signal nR/B indicating a busy state (for example, a low level) to the memory controller 400.

Referring to FIG. 7B, the memory device 300 may receive the read enable signal nRE in a toggle state from the memory controller 400. The read enable signal nRE may be toggled after the write enable signal nWE. The memory device 300 may transmit the data strobe signal DQS in a toggle state to the memory controller 400 in response to toggling of the read enable signal nRE. In other words, the data strobe signal DQS begins to toggle after the read enable signal nRE begins to toggle. For example, the first rising edge of the data strobe signal DQS may occur after a time period tDQSRE from the first rising edge of the read enable signal nRE. For example, the memory device 300 may transmit the data DATA from the memory controller 400 in an interval in which the data strobe signal DQS is in a toggle state. In this case, the memory device 300 may transmit the data DATA to the memory controller 400 via the data input/output signal DQ generated in the NRZ method.

In the read operation, the memory device 300 may read the data DATA from the memory cell array 330 in FIG. 2 in response to the read command. While the read operation is being executed, as described with reference to FIG. 2, the memory device 300 may transmit the ready/busy output signal nR/B indicating a busy state (for example, a low level) to the memory controller 400.

Hereinafter, for convenience of description, embodiments will be described based on an example in which the data input/output signal DQ is transmitted by the PAM-4 method, as illustrated in FIGS. 7A and 7B. However, the inventive concept is not limited thereto, and embodiments of the PAM-4 method may be extended to embodiments of the PAM-N methods (for example, PAM-8 and PAM-16 methods).

Figure 8:
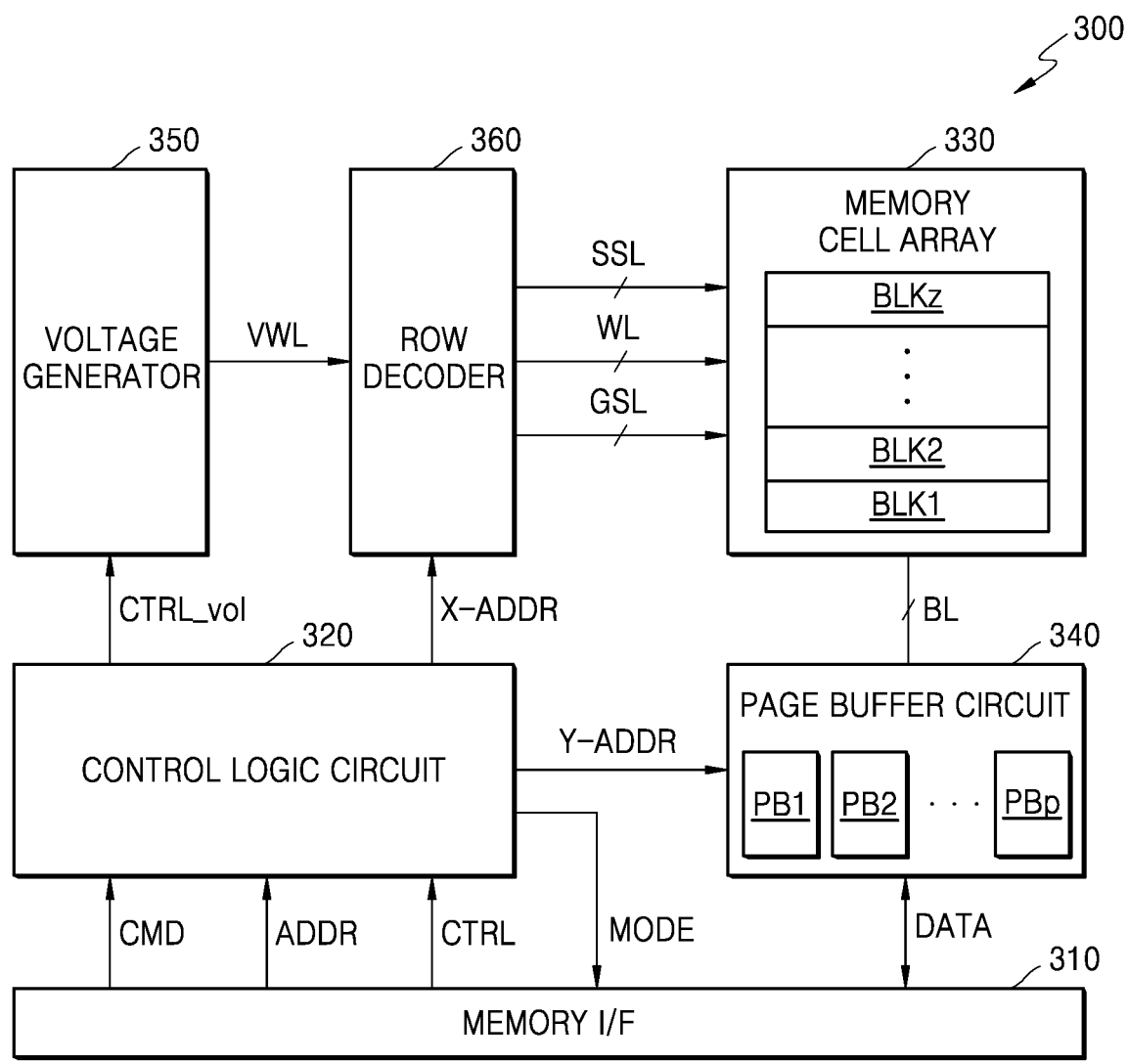
FIG. 8 is an example block diagram of the memory device in FIG. 2.

FIG. 8 is an example block diagram of the memory device 300 in FIG. 2. Referring to FIG. 8, the memory device 300 includes the memory interface circuit 310, the control logic circuit 320, the memory cell array 330, a page buffer circuit 340, a voltage generator 350, and a row decoder 360. The memory device 300 may further include a column logic, a pre-decoder, a temperature sensor, a command decoder, an address decoder, etc.

The memory interface circuit 310 may transmit the command CMD and the address ADDR received from the memory controller 400 via the data input/output signal DQ, and a control signal CTRL received via various signals (for example, CLE, ALE, nWE, and nRE, DQS, etc.) to the control logic circuit 320. The memory interface circuit 310 may transmit the data DATA received from the memory controller 400 via the data input/output signal DQ to the page buffer circuit 340. In addition, the memory interface circuit 310 may transmit the data DATA transmitted by the page buffer circuit 340 to the memory controller 400 via the data input/output signal DQ.

In an embodiment of the inventive concept, the memory interface circuit 310 may operate according to a mode signal MODE from the control logic circuit 320. For example, the memory interface circuit 310 may sample the data input/output signal DQ of the PAM-4 mode in the PAM-4 mode or generate the data input/output signal DQ in the PAM-4 mode, in response to the mode signal MODE. The memory interface circuit 310 may sample the data input/output signal DQ in the NRZ mode or generate the data input/output signal DQ in the NRZ mode, in response to the mode signal MODE in the NRZ mode.

The control logic circuit 320 may control various operations in the memory device 300. The control logic circuit 320 may output various control signals in response to the command CMD and/or the address ADDR from the memory interface circuit 310. For example, the control logic circuit 320 may output a voltage control signal CTRL_vol, a row address X-ADDR, a column address Y-ADDR, and the mode signal MODE.

In an embodiment of the inventive concept, the control logic circuit 320 may generate the mode signal MODE based on the control signal CTRL. The control logic circuit 320 may determine a symbol type of the data input/output signal DQ received via the memory interface circuit 310 based on the control signal CTRL. The control logic circuit 320 may generate the mode signal MODE according to the symbol type, as described with reference to FIGS. 5A through 5D. For example, the control logic circuit 320 may determine that the command CMD and the address ADDR are received via the data input/output signal DQ based on the control signal CTRL, and may generate the mode signal MODE corresponding to the PAM-4 mode. The control logic circuit 320 may determine that the data DATA is received via the data input/output signal DQ based on the control signal CTRL, and may generate the mode signal MODE corresponding to the NRZ mode.

The memory cell array 330 may include a plurality of memory blocks BLK1 through BLKz (z is a positive integer), and each of the plurality of memory blocks BLK1 through BLKz may include a plurality of memory cells. The memory cell array 330 may be connected to the page buffer circuit 340 via bit lines BL, and may be connected to the row decoder 360 via word lines WL, string select lines SSL, and ground select lines GSL.

In an embodiment of the inventive concept, the memory cell array 330 may include a three-dimensional memory cell array, and the three-dimensional memory cell array may include a plurality of NAND strings. Each NAND string may include memory cells respectively connected to word lines vertically stacked on a substrate. U.S. Pat. Nos. 7,679, 133, 8,553,466, 8,654,587, 8,559,235, and U.S. Patent Application Publication No. 2011/0233648 are incorporated by reference herein in their entireties. In an embodiment of the inventive concept, the memory cell array 330 may include a two-dimensional memory cell array, and the two-dimensional memory cell array may include a plurality of NAND strings that are arranged in rows and columns.

The page buffer circuit 340 may include a plurality of page buffers PB1 through PBp (p is an integer of 3 or more), and the plurality of page buffers PB1 through PBp may be connected to the memory cells via the plurality of bit lines BL. The page buffer circuit 340 may select at least one bit line BL of the bit lines BL in response to the column address Y-ADDR. The page buffer circuit 340 may operate as a write driver or a sense amplifier according to an operation mode. For example, during a program operation, the page buffer circuit 340 may apply a bit line voltage corresponding to data to be programmed to the selected bit line BL. During a read operation, the page buffer circuit 340 may sense data stored in the memory cell by sensing a current or voltage of the selected bit line.

The voltage generator 350 may generate various types of voltages for performing program, read, and erase operations based on the voltage control signal CTRL_vol. For example, the voltage generator 350 may generate a program voltage, a read voltage, a program verification voltage, an erase voltage, or the like, as a word line voltage VWL.

The row decoder 360 may select one of the plurality of word lines WL in response to the row address X-ADDR, and may select one of the plurality of string select lines SSL. For example, during the program operation, the row decoder 360 may apply the program voltage and the program verification voltage to the selected word line WL, and may apply the read voltage to the selected word line WL during the read operation.

FIG. 9 is a diagram of examples for generating the mode signals MODE in FIG. 8. Referring to FIGS. 8 and 9, the control logic circuit 320 may generate the mode signals MODE based on various conditions. The data input/output signal DQ including the command CMD and the address ADDR may be sampled in the PAM-4 mode and the data input/output signal DQ including the data DATA may be sampled in the NRZ mode, according to the mode signal MODE generated based on the conditions in FIG. 9. In addition, the data input/output signal DQ including the data DATA may be generated in the NRZ method according to the mode signal MODE generated based on the conditions in FIG. 9.

In an embodiment of the inventive concept, when the command latch enable signal CLE or the address latch enable signal ALE is in an enable state, the control logic circuit 320 may generate the mode signal MODE corresponding to the PAM-4 mode. This is illustrated in CASE 1. When the command latch enable signal CLE and the address latch enable signal ALE are disabled, the control logic circuit 320 may generate the mode signal MODE corresponding to the NRZ mode. This is illustrated in CASE 1.

In an embodiment of the inventive concept, the control logic circuit 320 may generate the mode signal MODE based on a DQ enable signal DQE. In this case, the DQ enable signal DQE may include the control signal CTRL transmitted by the memory controller 400 by the PAM-4 method, to distinguish the symbol type of the data input/output signal DQ. The DQ enable signal DQE may be transmitted by the memory controller 400 to the memory device 300 via a separate pin. In this case, the command latch enable signal CLE and the address latch enable signal ALE may not be transmitted. Accordingly, the number of pins used to distinguish the symbol type of the data input/output signal DQ may be reduced.

For example, when a voltage level of the DQ enable signal DQE is the first voltage level VL1, the command CMD may be transmitted via the data input/output signal DQ. When the voltage level of the DQ enable signal DQE is the second voltage level VL2, the address ADDR may be transmitted via the data input/output signal DQ. When the voltage level of the DQ enable signal DQE is the third voltage level VL3, the data DATA may be transmitted via the data input/output signal DQ. In other words, the first voltage level VL1 of the DQ enable signal DQE may correspond to an enable state of the command latch enable signal CLE, and the second voltage level VL2 of the DQ enable signal DQE may correspond to an enable state of the address latch enable signal ALE. Accordingly, when the voltage level of the DQ enable signal DQE is the first voltage level VL1 or the second voltage level VL2, the control logic circuit 320 may generate the mode signal MODE corresponding to the PAM-4 mode, and when the voltage level of the DQ enable signal DQE is the third voltage level VL3 or the fourth voltage level VL4, the control logic circuit 320 may generate the mode signal MODE corresponding to the NRZ mode. This is illustrated in CASE 2.

In an embodiment of the inventive concept, when the write enable signal nWE is in a toggle state, the control logic circuit 320 may generate the mode signal MODE corresponding to the PAM-4 mode. This is illustrated in CASE 3. When the write enable signal nWE is in a toggle-off state (for example, a high level state), the control logic circuit 320 may generate the mode signal MODE corresponding to the NRZ mode. This is illustrated in CASE 3.

In an embodiment of the inventive concept, when the data strobe signal DQS received from the memory controller 400 or transmitted to the memory controller 400 is in a toggle-off state (for example, a high level state or a high resistance (hi-z) state), the control logic circuit 320 may generate the mode signal MODE corresponding to the PAM-4 mode. This is illustrated in CASE 4. When the data strobe signal DQS or the read enable signal nRE received from the memory controller 400 or transmitted to the memory controller 400 is in a toggle state, the control logic circuit 320 may generate the mode signal MODE corresponding to the NRZ mode. This is illustrated in CASE 4. For example, when the data strobe signal DQS is in a toggle state in the program operation, the control logic circuit 320 may generate the mode signal MODE corresponding to the NRZ mode. When the data strobe signal DQS or the read enable signal nRE is in a toggle state in the read operation, the control logic circuit 320 may generate the mode signal MODE corresponding to the NRZ mode.

In an embodiment of the inventive concept, the control logic circuit 320 may generate the mode signal MODE based on a mode setting signal MSS. In this case, the mode setting signal MSS may be the control signal CTRL transmitted by the memory controller 400 to the memory device 300 to determine a sampling method or a modulation method for the data input/output signal DQ of the memory device 300. The mode setting signal MSS may be transmitted by the memory controller 400 to the memory device 300 via a separate mode setting pin (for example, a flag pin). For example, when '1' is transmitted via the mode setting signal MSS, the control logic circuit 320 may generate the mode signal MODE corresponding to the PAM-4 mode. This is illustrated in CASE 5. When '0' is transmitted via the mode setting signal MSS, the control logic circuit 320 may generate the mode signal MODE corresponding to the NRZ mode. This is illustrated in CASE 5. However, the inventive concept is not limited thereto, and the mode signal MODE indicating various modes (for example, PAM-4, PAM-8, PAM-16, and NRZ modes) based on the mode setting signal MSS may be generated. In another embodiment of the inventive concept, the mode setting signal MSS may be transmitted by the memory controller 400 to the memory device 300 based on a set feature command.

FIG. 9 illustrates an example in which the control logic circuit 320 generates the mode signal MODE according to the embodiment of FIG. 5A, but the examples of generating the mode signals MODE in FIG. 9 may be applied to the embodiments of FIGS. 5B through 5D. In the embodiment of FIG. 5B, the control logic circuit 320 may generate the mode signal MODE in modes opposite to the modes of FIG. 9 in response to the conditions of FIG. 9. For example, when the command latch enable signal CLE or the address latch enable signal ALE is in an enable state, the control logic circuit 320 may generate the mode signal MODE corresponding to the NRZ mode. When the command latch enable signal CLE and the address latch enable signal ALE are disabled, the control logic circuit 320 may generate the mode signal MODE corresponding to the PAM-4 mode. In this case, the data input/output signal DQ including the command CMD and the address ADDR may be sampled in the NRZ mode, and the data input/output signal DQ including the data DATA may be sampled in the PAM-4 mode. In addition, the data input/output signal DQ including the data DATA may be generated in the PAM-4 method.

Hereinafter, with reference to FIGS. 10 to 16, a transmitter for generating the data input/output signal DQ in a method selected from the PAM-4 method and the NRZ method, and a receiver for sampling the data input/output signal DQ in a mode selected from the PAM-4 mode and the NRZ mode will be described in detail. For convenience of description, a transmitter and a receiver according to embodiments of the inventive concept will be described based on the second transmitter 401 and the first receiver 302 in FIG. 3. In this case, in FIG. 3, the first transmitter 301 and the second receiver 402 may be configured substantially the same as the second transmitter 401 and the first receiver 302, respectively.

Figure 10:
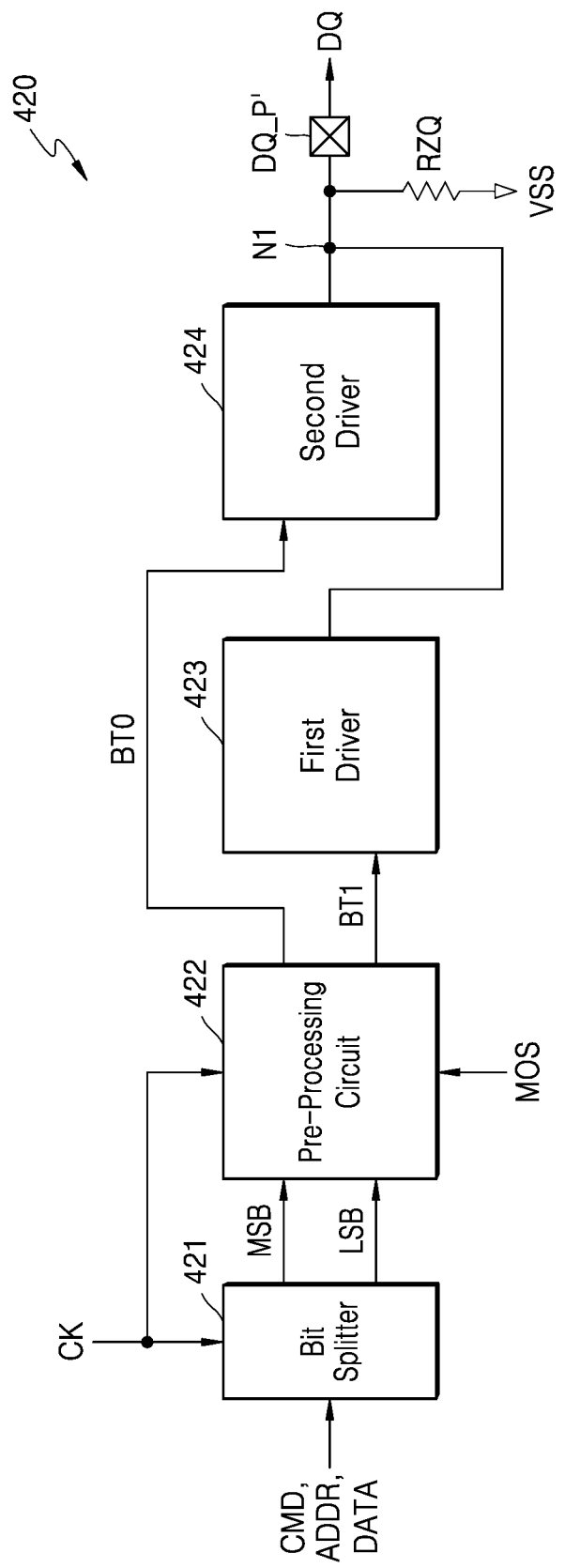
FIG. 10 is a block diagram of an example of a transmitter, according to an embodiment of the inventive concept.

FIG. 10 is a block diagram of an example of a transmitter, according to an embodiment of the inventive concept. A transmitter 420 may correspond to the second transmitter 401 of the memory controller 400 in FIG. 3. Referring to FIG. 10, the transmitter 420 may include a bit divider or a bit splitter 421, a pre-processing circuit 422, a first driver 423, and a second driver 424. The transmitter 420 may further include a resistor RZQ arranged between the DQ pin DQ_P' and a ground voltage VSS.

The bit splitter 421 may split or divide bits of the command CMD, the address ADDR, or the data DATA to be transmitted via the transmitter 420 by two bits based on a clock signal CK. The split two bits may be divided into a most significant bit MSB and a least significant bit LSB. The most significant bit MSB and the least significant bit LSB may be provided to the pre-processing circuit 422. For example, the most significant bit MSB and the least significant bit LSB may be transmitted to the pre-processing circuit 422 in parallel.

In an embodiment of the inventive concept, a frequency of the clock signal CK may vary according to the symbol type to be transmitted based on the data input/output signal DQ. For example, the frequency of the clock signal CK for transmitting the data DATA may be greater than the frequency of the clock signal CK for transmitting the command CMD and the address ADDR.

The pre-processing circuit 422 may receive the most significant bit MSB and the least significant bit LSB, and may preprocess the most significant bit MSB and the least significant bit LSB based on the clock signal CK and a mode switching signal MOS. Accordingly, the pre-processing circuit 422 may generate a first bit BT0 and a second bit BT1. For example, the pre-processing circuit 422 may generate 4-phase clock signals based on the clock signal CK, and generate the first bit BT0 and the second bit BT1 based on the generated 4-phase clock signals.

The pre-processing circuit 422 may operate in the PAM-4 mode or the NRZ mode according to the mode switching signal MOS. For example, the pre-processing circuit 422 may generate the first bit BT0 based on a value of the least significant bit LSB and may generate the second bit BT1 based on a value of the most significant bit MSB, in response to the mode switching signal MOS corresponding to the PAM-4 mode. In this case, the pre-processing circuit 422 may output the first bit BT0 and the second bit BT1 respectively corresponding to the least significant bit LSB and the most significant bit MSB at the same timing (for example, an edge timing of the clock signal CK). For example, the pre-processing circuit 422 may generate the first bit BT0 and the second bit BT1 based on the value of the most significant bit MSB and then, may generate the first bit BT0 and the second bit BT1 based on the value of the least significant bit LSB, in response to the mode switching signal MOS indicating the NRZ mode. Alternatively, the pre-processing circuit 422 may generate the first bit BT0 and the second bit BT1 based on the value of the least significant bit LSB, and then, may generate the first bit BT0 and the second bit BT1 based on the value of the most significant bit MSB. In other words, in the NRZ mode, the first bit BT0 and the second bit BT1 may be generated to have the same value according to the value of the most significant bit MSB or the least significant bit LSB. In this case, the pre-processing circuit 422 may output the first bit BT0 and the second bit BT1 corresponding to the most significant bit MSB at a first timing (for example, a first edge timing of the clock signal CK), and may output the first bit BT0 and the second bit BT1 corresponding to the least significant bit LSB at a second timing (for example, a second edge timing of the clock signal CK). For example, the pre-processing circuit 422 may generate the first bit BT0 and the second bit BT1 based on the 4-phase clock signals in the NRZ mode.

The first driver 423 may pull-down or pull-up a voltage of a first node N1 based on the second bit BT1. The second driver 424 may pull-down or pull-up the voltage of the first node N1 based on the first bit BT0. For example, when the second bit BT1 is '0', the first driver 423 may pull-up the first node N1, and when the second bit BT1 is '1', may pull-down the first node N1. For example, a voltage magnitude of the first node N1 changing due to the first driver 423 may be greater than that of the first node N1 changing due to the second driver 424.

In the PAM-4 mode, the voltage of the first node N1 may be controlled to be one of the first through fourth voltage levels VL1 through VL4 in FIG. 4A by the first driver 423 and the second driver 424. In the NRZ mode, the voltage of the first node N1 may be controlled to be one of the first and fourth voltage levels VL1 and VL4 by the first driver 423 and the second driver 424. Accordingly, the data input/output signal DQ having one of the first through fourth voltage levels VL1 through VL4 may be generated in the PAM-4 mode, and the data input/output signal DQ having one of the first and fourth voltage levels VL1 and VL4 may be generated in the NRZ mode.

As illustrated in FIG. 10, two drivers, in other words, the first and second drivers 423 and 424, may be used to transmit two bits (in other words, the most significant bit MSB and the least significant bit LSB) in the PAM-4 mode. However, the inventive concept is not limited thereto, and M drivers (in other words, first through $M^{th}$ drivers) may be used to transmit M bits in the PAM-N mode. In this case, the bit splitter 421 may split or divide the bits of the command CMD, the address ADDR, and the data DATA by M bits, and the pre-processing circuit 422 may generate the first through $M^{th}$ bits to be provided to M drivers by pre-processing M bits. Accordingly, the first through $M^{th}$ drivers may generate a data input/output signal having one of the first through $M^{th}$ voltage levels based on the first through $M^{th}$ bits.

FIG. 11A illustrates an example operation of the transmitter 420 of FIG. 10 in the PAM-4 mode. FIG. 11B illustrates an example operation of the transmitter 420 of FIG. 10 in the NRZ mode.

Referring to FIGS. 10 and 11A, in the PAM-4 mode, the transmitter 420 may generate the data input/output signal DQ having one of first through fourth voltage levels VL1 through VL4 based on bits of the command CMD, the address ADDR, or the data DATA. The transmitter 420 may generate the data input/output signal DQ corresponding to two bits, in other words, the MSB and LSB, during one cycle of the clock signal CK (for example, during the unit interval UI in FIGS. 4A and 4B).

As illustrated in FIG. 11A, when the most significant bit MSB is '1' and the least significant bit LSB is '1', the pre-processing circuit 422 may generate '0' as the first bit BT0, and may generate '0' as the second bit BT1. In this case, the data input/output signal DQ having the first voltage level VL1 may be generated by the first driver 423 and the second driver 424.

When the most significant bit MSB is '1' and the least significant bit LSB is '0', the pre-processing circuit 422 may generate '1' as the first bit BT0 and '0' as the second bit BT1. In this case, the data input/output signal DQ having the second voltage level VL2 may be generated by the first driver 423 and the second driver 424.

When the most significant bit MSB is '0' and the least significant bit LSB is '1', the pre-processing circuit 422 may generate '0' as the first bit BT0 and '1' as the second bit BT1. In this case, the data input/output signal DQ having the third voltage level VL3 may be generated by the first driver 423 and the second driver 424.

When the most significant bit MSB is '0' and the least significant bit LSB is '0', the pre-processing circuit 422 may generate '1' as the first bit BT0 and '1' as the second bit BT1. In this case, the data input/output signal DQ having the fourth voltage level VL4 may be generated by the first driver 423 and the second driver 424.

Referring to FIGS. 10 and 11B, in the NRZ mode, the transmitter 420 may generate the data input/output signal DQ having one of first and fourth voltage levels VL1 and VL4 based on bits of the command CMD, the address ADDR, or the data DATA. The transmitter 420 may generate the data input/output signal DQ corresponding to one bit (for example, the most significant bit MSB) during a first cycle of the clock signal CK (hereinafter, referred to as the first cycle), and may generate the data input/output signal DQ corresponding to one bit (for example, the least significant bit LSB) during a second cycle of the clock signal CK (hereinafter, referred to as the second cycle).

As illustrated in FIG. 11B, when the most significant bit MSB is '1' and the least significant bit LSB is '1', the pre-processing circuit 422 may generate '0' as the first bit BT0, and generate '0' as the second bit BT1 during the first cycle. In this case, the data input/output signal DQ having the first voltage level VL1 may be generated by the first driver 423 and the second driver 424. In other words, in the first cycle, the data input/output signal DQ may have the first voltage level VL1. The pre-processing circuit 422 may generate '0' as the first bit BT0 and generate '0' as the second bit BT1 during the second cycle. In this case, the data input/output signal DQ having the first voltage level VL1 may be generated by the first driver 423 and the second driver 424. In other words, in the second cycle, the data input/output signal DQ may have the first voltage level VL1.

When the most significant bit MSB is '1' and the least significant bit LSB is '0', the pre-processing circuit 422 may generate '0' as the first bit BT0 and '0' as the second bit BT1 during the first cycle. In this case, the data input/output signal DQ having the first voltage level VL1 may be generated by the first driver 423 and the second driver 424. In other words, in the first cycle, the data input/output signal DQ may have the first voltage level VL1. The pre-processing circuit 422 may generate '1' as the first bit BT0 and generate '1' as the second bit BT1 during the second cycle. In this case, the data input/output signal DQ having the fourth voltage level VL4 may be generated by the first driver 423 and the second driver 424. In other words, in the second cycle, the data input/output signal DQ may have the fourth voltage level VL4.

When the most significant bit MSB is '0' and the least significant bit LSB is '1', the pre-processing circuit 422 may generate '1' as the first bit BT0 and '1' as the second bit BT1 during the first cycle. In this case, the data input/output signal DQ having the fourth voltage level VL4 may be generated by the first driver 423 and the second driver 424. In other words, in the first cycle, the data input/output signal DQ may have the fourth voltage level VL4. The pre-processing circuit 422 may generate '0' as the first bit BT0 and generate '0' as the second bit BT1 during the second cycle. In this case, the data input/output signal DQ having the first voltage level VL1 may be generated by the first driver 423 and the second driver 424. In other words, in the second cycle, the data input/output signal DQ may have the first voltage level VL1.

When the most significant bit MSB is '0' and the least significant bit LSB is '0', the pre-processing circuit 422 may generate '1' as the first bit BT0 and '1' as the second bit BT1 during the first cycle. In this case, the data input/output signal DQ having the fourth voltage level VL4 may be generated by the first driver 423 and the second driver 424. In other words, in the first cycle, the data input/output signal DQ may have the fourth voltage level VL4. The pre-processing circuit 422 may generate '1' as the first bit BT0 and generate '1' as the second bit BT1 during the second cycle. In this case, the data input/output signal DQ having the fourth voltage level VL4 may be generated by the first driver 423 and the second driver 424. In other words, in the second cycle, the data input/output signal DQ may have the fourth voltage level VL4.

As described above, the most significant bit MSB and the least significant bit LSB (in other words, two bits) may be transmitted during one cycle of the clock signal CK in the PAM-4 mode, and during two cycles of the clock signal CK in the NRZ mode. Accordingly, the command CMD and the address ADDR may be transmitted faster in the PAM-4 mode than in the NRZ mode.

Figure 12:
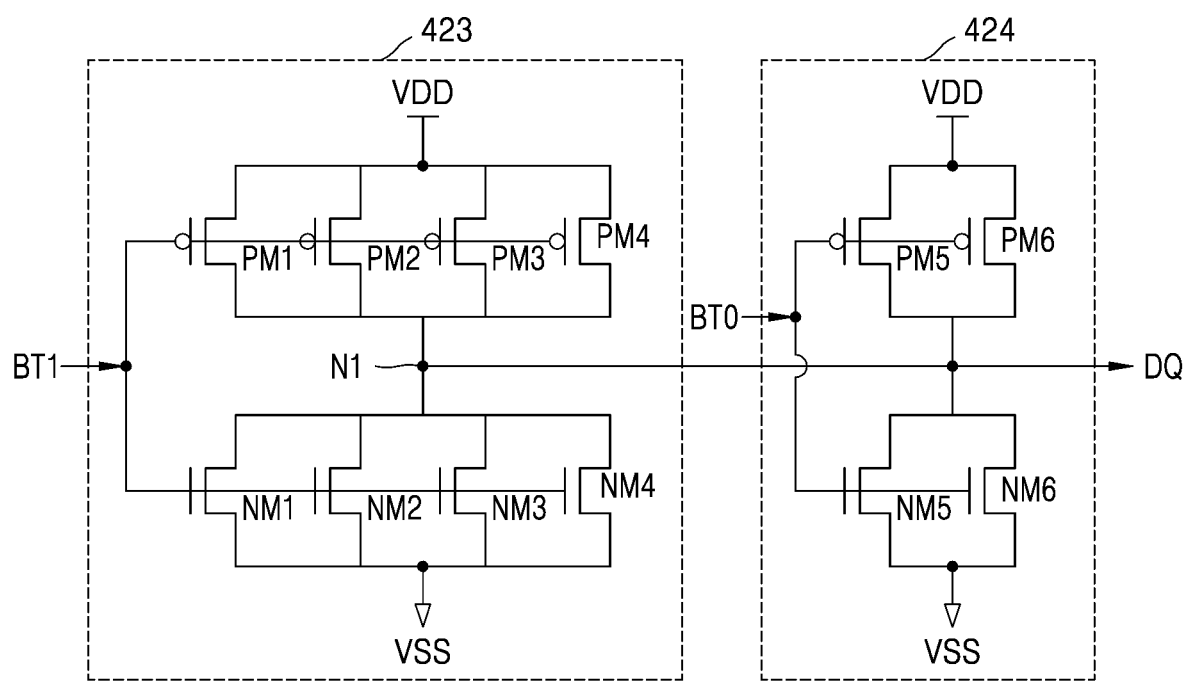
FIG. 12 is an example circuit diagram of a first driver and a second driver in FIG. 10.

FIG. 12 is an example circuit diagram of the first driver 423 and the second driver 424 in FIG. 10. Referring to FIG. 12, the first driver 423 may include first to fourth p-type transistors (hereinafter, referred to as p-channel metal-oxide-semiconductors (PMOS)) PM1 through PM4 and first through fourth n-type transistors (hereinafter, referred to as n-channel metal-oxide-semiconductors (NMOS)) NM1 through NM4. When the second bit BT1 is '0', the first through fourth PMOSs PM1 through PM4 may be turned on and the voltage of the first node N1 is pulled up based on the power voltage VDD. In this case, the first through fourth NMOSs NM1 through NM4 may be turned off. When the second bit BT2 is '1', the first through fourth NMOSs NM1 through NM4 may be turned on and the voltage of the first node N1 is pulled down based on the ground voltage VSS. In this case, the first through fourth PMOSs PM1 through PM4 may be turned off.

The second driver 424 may include fifth and sixth PMOSs PM5 and PM6, and fifth and sixth NMOSs NM5 and NM6. When the first bit BT0 is '0', the fifth and sixth PMOSs PM5 and PM6 may be turned on and the voltage of the first node N1 may be pulled up based on the power voltage VDD. In this case, the fifth and sixth NMOSs NM5 and NM6 may be turned off. When the first bit BT0 is '1', the fifth and sixth NMOSs NM5 and NM6 may be turned on and the voltage of the first node N1 may be pulled down based on the ground voltage VSS. In this case, the fifth and sixth PMOSs PM5 and PM6 may be turned off.

As illustrated in FIG. 12, because the first driver 423 includes more transistors for pull-up and pull-down operations than the second driver 424, a pull-up level and pull-down level of the first node N1 due to the first driver 423 may be greater than a pull-up level and pull-down level of the first node N1 due to the second driver 424. Accordingly, according to the first bit BT0 and the second bit BT1 generated in the PAM-4 mode, the voltage of the first node N1 may be one of the first through fourth voltage levels VL1 through VL4 and the data input/output signal DQ having one of the first through fourth voltage levels VL1 through VL4 may be generated. In addition, according to the first bit BT0 and the second bit BT1 generated in the NRZ mode, the voltage of the first node N1 may have one of the first and fourth voltage levels VL1 and VL4 and the data input/output signal DQ having one of the first and fourth voltage levels VL1 and VL4 may be generated.

Figure 13:
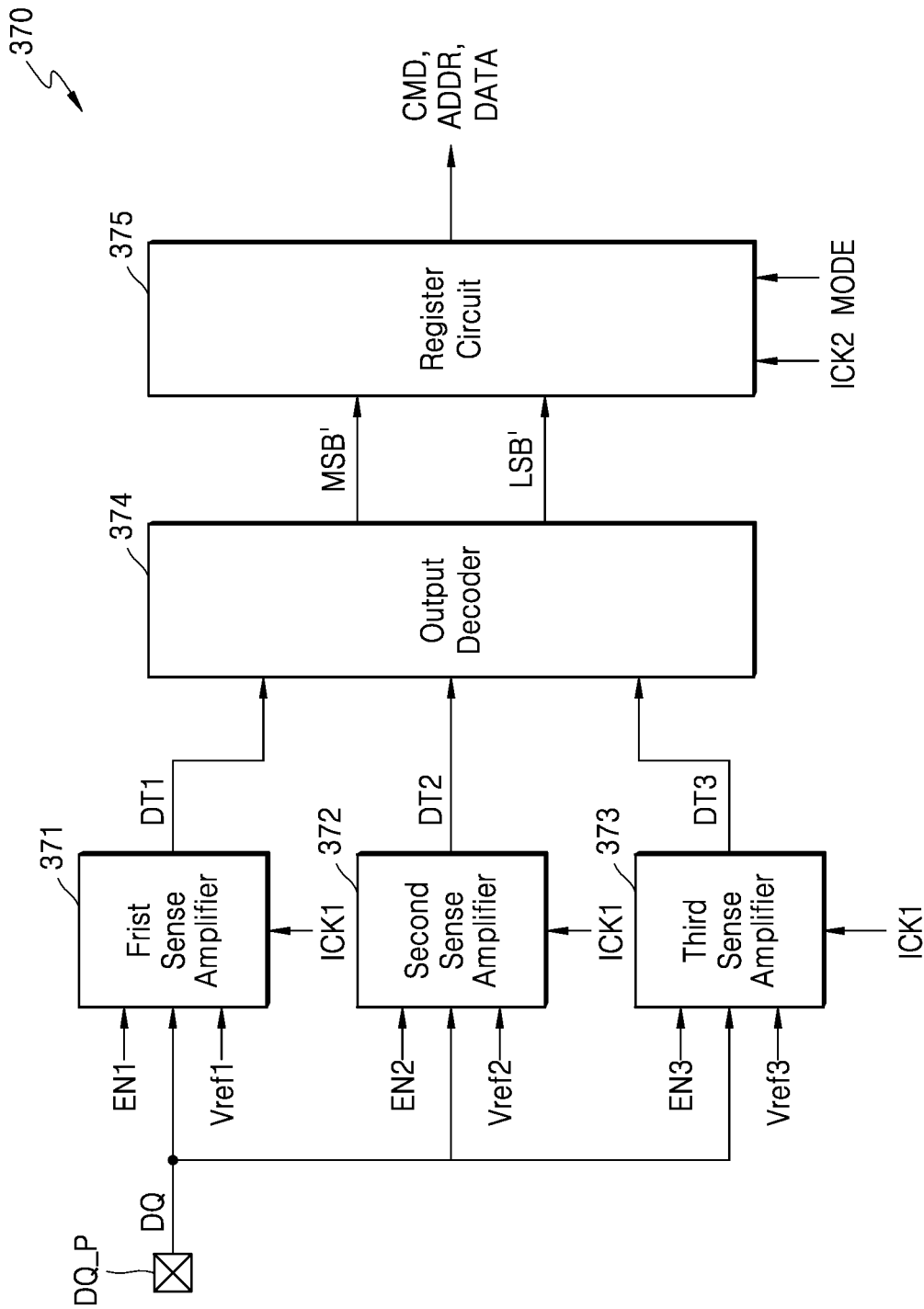
FIG. 13 is a block diagram of an example of a receiver, according to an embodiment of the inventive concept.

FIG. 13 is a block diagram of an example of a receiver, according to an embodiment of the inventive concept. A receiver 370 may correspond to the first receiver 302 in the memory device 300 in FIG. 3. Referring to FIG. 13, the receiver 370 may include first through third sense amplifiers 371 through 373, an output decoder 374, and a register circuit 375.

Each of the first through third sense amplifiers 371 through 373 may receive the data input/output signal DQ. Each of the first through third sense amplifiers 371 through 373 may operate based on a first internal clock signal ICK1. The first sense amplifier 371 may compare the voltage level of the data input/output signal DQ to the first reference voltage Vref1 and output a first comparison result DT1. The second sense amplifier 372 may compare the voltage level of the data input/output signal DQ to the second reference voltage Vref2 and output a second comparison result DT2. The third sense amplifier 373 may compare the voltage level of the data input/output signal DQ to the third reference voltage Vref3 and output a third comparison result DT3. For example, when the voltage level of the data input/output signal DQ is greater than the first reference voltage Vref1, the first sense amplifier 371 may output '1' as the first comparison result DT1. When the voltage level of the data input/output signal DQ is less than the first reference voltage Vref1, the first sense amplifier 371 may output '0' as the first comparison result DT1. As another example, when the voltage level of the data input/output signal DQ is greater than the third reference voltage Vref3, the third sense amplifier 373 may output '1' as the third comparison result DT3.

The first through third sense amplifiers 371 through 373 may output first through third comparison results DT1 through DT3 based on the first through third comparison enable signals EN1 through EN3, respectively. For example, the first sense amplifier 371 may compare the voltage level of the data input/output signal DQ to the first reference voltage Vref1 in response to the first comparison enable signal EN1 in an enable state (for example, a high level state), and output the first comparison result DT1. The first sense amplifier 371 may output a certain value (for example, '0') as the first comparison result DT1 in response to the first comparison enable signal EN1 in a disabled state (for example, a low level state). In other words, the first comparison enable signal EN1 controls a comparison operation of the first sense amplifier 371 at a first level and controls an output operation of the first sense amplifier 371 at a second level different from the first level. Similarly, the second and third sense amplifiers 372 and 373 may output second and third comparison results DT2 and DT3 based on the second and third comparison enable signals EN2 and EN3, respectively.

In an embodiment of the inventive concept, the first through third comparison enable signals EN1 through EN3 may be generated according to the mode signal MODE in FIG. 8. For example, the first through third comparison enable signals EN1 through EN3 in an enable state may be generated according to the mode signal MODE corresponding to the PAM-4 mode. In this case, the first through third sense amplifiers 371 through 373 may compare the voltage level of the data input/output signal DQ to the first through third reference voltages Vref1 through Vref3, and output the first through third comparison results DT1 through DT3. According to the mode signal MODE corresponding to the NRZ mode, the first and third comparison enable signals EN1 and EN3 in a disabled state may be generated and the second comparison enable signal EN2 in an enabled state may be generated. In this case, the first and third sense amplifiers 371 and 373 may output the first and third comparison results DT1 and DT3 of a certain value (for example, '0'), and the second sense amplifier 372 may compare the voltage level of the data input/output signal DQ to the second reference voltage Vref2 and output the second comparison result DT2. For example, the first through third comparison enable signals EN1 through EN3 may be generated by the receiver 370 based on the mode signal MODE, or may be provided to the receiver 370 together with the mode signal MODE by the control logic circuit 320.

As described with reference to FIG. 2, the first internal clock signal ICK1 may be generated based on a signal of a toggle state received from the memory controller 400 (for example, the write enable signal nWE or the data strobe signal DQS). For example, when the write enable signal nWE in a toggle state is received as the command CMD and the address ADDR are received from the memory controller 400, the first internal clock signal ICK1 may be generated based on the write enable signal nWE. When the data strobe signal DQS in a toggle state is received as the data DATA is received from the memory controller 400, the first internal clock signal ICK1 may be generated based on the data strobe signal DQS. For example, the first internal clock signal ICK1 corresponding to a first frequency may be generated based on the write enable signal nWE, and the first internal clock signal ICK1 corresponding to a second frequency greater than the first frequency may be generated based on the data strobe signal DQS. Accordingly, a sampling period of the data input/output signal DQ including the command CMD and the address ADDR may be greater than a sampling period of the data input/output signal DQ including the data DATA.

The output decoder 374 may generate a most significant bit MSB' and a least significant bit LSB' by performing the decoding operation based on the first through third comparison results DT1 through DT3. For example, the output decoder 374 may generate the most significant bit MSB' and the least significant bit LSB' according to a certain decoding rule (for example, a pre-stored table of FIG. 14). For example, in the PAM-4 mode, both the most significant bit MSB' and the least significant bit LSB' generated based on the first through third comparison results DT1 through DT3 may have valid values. In the NRZ mode, the most significant bit MSB' generated based on the first through third comparison results DT1 through DT3 may have a valid value, while the least significant bit LSB' has an invalid value. In other words, two bits that are valid may be output in parallel as the most significant bit MSB' and the least significant bit LSB' in the PAM-4 mode, and one of the two valid bits may be output as the most significant bit MSB' at the first timing and the other one may be output as the most significant bit MSB' at a second timing, in the NRZ mode.

The register circuit 375 may operate based on a second internal clock signal ICK2 and the mode signal MODE. The register circuit 375 may store the most significant bit MSB' and the least significant bit LSB' in internal registers based on the second internal clock signal ICK2, and may output at least one of the most significant bit MSB' and the least significant bit LSB' according to the mode signal MODE as the command CMD, the address ADDR, or the data DATA.

In the PAM-4 mode (in other words, when the mode signal MODE corresponding to the PAM-4 mode is received), the register circuit 375 may output the most significant bit MSB' and the least significant bit LSB' that are stored based on the second internal clock signal ICK2. For example, the register circuit 375 may output the most significant bit MSB' and the least significant bit LSB' in series or in parallel. In the NRZ mode (in other words, when the mode signal MODE corresponding to the NRZ mode is received), the register circuit 375 may output only the most significant bit MSB' among the most significant bit MSB' and the least significant bit LSB' that are stored based on the second internal clock signal ICK2. In the PAM-4 mode and the NRZ mode, bits output from the register circuit 375 may be transmitted to a core circuit (for example, the control logic circuit 320 or the page buffer circuit 340 in FIG. 8) as the command CMD, the address ADDR, or the data DATA.

The second internal clock signal ICK2 may be generated based on a signal in a toggle state received from the memory controller 400. For example, the second internal clock signal ICK2, like the first internal clock signal ICK1, may be generated based on the write enable signal nWE or the data strobe signal DQS. For example, the second internal clock signal ICK2 may include a plurality of clock signals having different phases from each other (for example, clock signals ICK2[0] and ICK2[1] in FIG. 15A). In this case, the most significant bit MSB' and the least significant bit LSB' may be stored in the register circuit 375 based on the plurality of clock signals.

As illustrated in FIG. 13, in the PAM-4 mode, three sense amplifiers, in other words, 371 through 373, may be used to obtain two bits (for example, the most significant bit MSB' and least significant bit LSB') from the data input/output signal DQ. However, the inventive concept is not limited thereto, and in the PAM-N mode, (N−1) sense amplifiers (for example, first through (N−1)$^{th}$ sense amplifiers) may be used to obtain M bits from the data input/output signal DQ. In this case, in the PAM-N mode, the first through (N−1)$^{th}$ sense amplifiers may output first through (N−1)$^{th}$ comparison results by comparing the voltage level of the data input/output signal DQ to each of first through (N−1)$^{th}$ reference voltages, and in the NRZ mode, may output the first through (N−1)$^{th}$ comparison results by comparing the voltage level of the data input/output signal DQ to a certain reference voltage of the first through (N−1)$^{th}$ reference voltages (for example, a reference voltage of an intermediate level). In the NRZ mode, the first through (N−1)$^{th}$ sense amplifiers may output each of remaining comparison results except comparison results corresponding to particular reference voltages among the first through (N−1)$^{th}$ comparison results as a certain value (for example, '0'). The output decoder 374 may output M bits by performing the decoding operation based on (N−1) comparison results. The register circuit 375 may output M bits, that are output by the output decoder 374 in the PAM-N mode, as the command CMD, the address ADDR, or the data DATA, and may output one bit of M bits, that are output by the output decoder 374 in the NRZ mode, as the command CMD, the address ADDR, or the data DATA.

FIG. 14 is a diagram of an example operation of the receiver 370 of FIG. 13. Referring to FIGS. 13 and 14, when the data input/output signal DQ is transmitted by the PAM-4 method, the first through third sense amplifiers 371 through 373 may output '111', '011', '001', and '000', in response to the first through fourth voltage levels VL1 through VL4 of the data input/output signal DQ, as the first through third comparison results DT1 through DT3, respectively. In this case, the output decoder 374 may output '11', '10', '01', and '00' as the most significant bit MSB' and the least significant bit LSB' in response to the first through third comparison results DT1 through DT3. The register circuit 375 may output the output bits '11', '10', '01', and '00', as the command CMD, the address ADDR, or the data DATA. The output bits '11', '10', '01', and '00' may be the same as the most significant bit MSB and the least significant bit LSB corresponding to the first through fourth voltage levels VL1 through VL4 in FIG. 11A, respectively. In other words, the most significant bit MSB and the least significant bit LSB transmitted by the PAM-4 method by the transmitter 420 of FIG. 10 may be obtained by the receiver 370 operating in the PAM-4 mode.

When the data input/output signal DQ is transmitted in the NRZ method, the first through third sense amplifiers 371 through 373 may output '010' and '000', in response to the first and fourth voltage levels VL1 and VL4 of the data input/output signal DQ, as the first through third comparison results DT1 through DT3, respectively. In this case, the output decoder 374 may output '11' and '00' as the most significant bit MSB' and the least significant bit LSB' in response to the first through third comparison results DT1 through DT3. The register circuit 375 may output only the most significant bits MSB', in other words, '1' and '0' among the output bits, in other words, '11' and '00', as the command CMD, the address ADDR, or the data DATA. The most significant bit MSB', in other words, '1' and '0' among the output bits, in other words, '11' and '00', may be the same as the most significant bit MSB or the least significant bit LSB corresponding to each of the first and fourth voltage levels VL1 and VL4) in FIG. 11B. For example, when the most significant bit MSB is transmitted during the first cycle in the NRZ method by the transmitter 420 of FIG. 10, and the least significant bit LSB is transmitted during the second cycle, the most significant bit MSB' output based on the data input/output signal DQ of the first cycle may be the same as the most significant bit MSB, and the most significant bit MSB' output based on the data input/output signal DQ of the second cycle may be the same as the least significant bit LSB. In other words, the most significant bit MSB and the least significant bit LSB transmitted by the NRZ method by the transmitter 420 of FIG. 10 may be obtained by the receiver 370 operating in the NRZ mode.

Figure 15A:
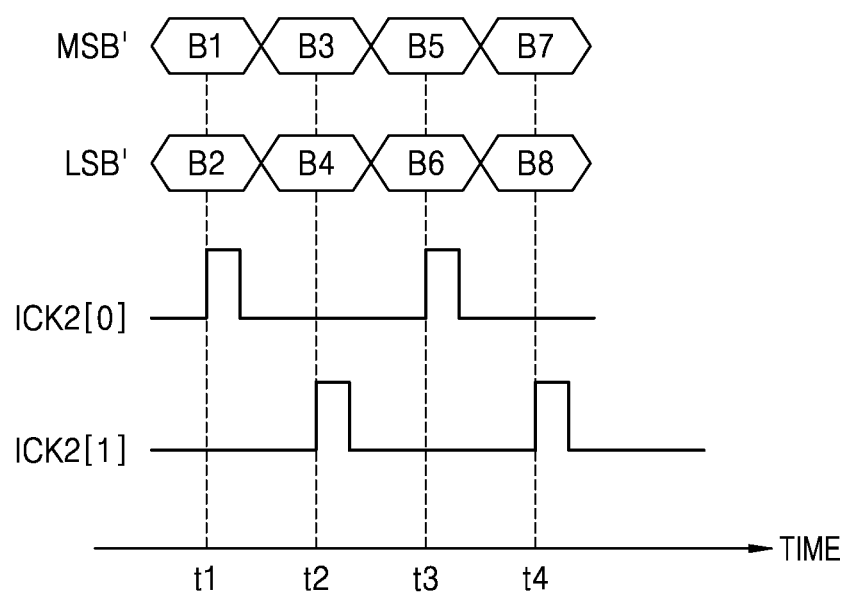
FIG. 15A is a timing diagram of an example operation of the register circuit in FIG. 13 in a PAM-4 mode.
Figure 15B:
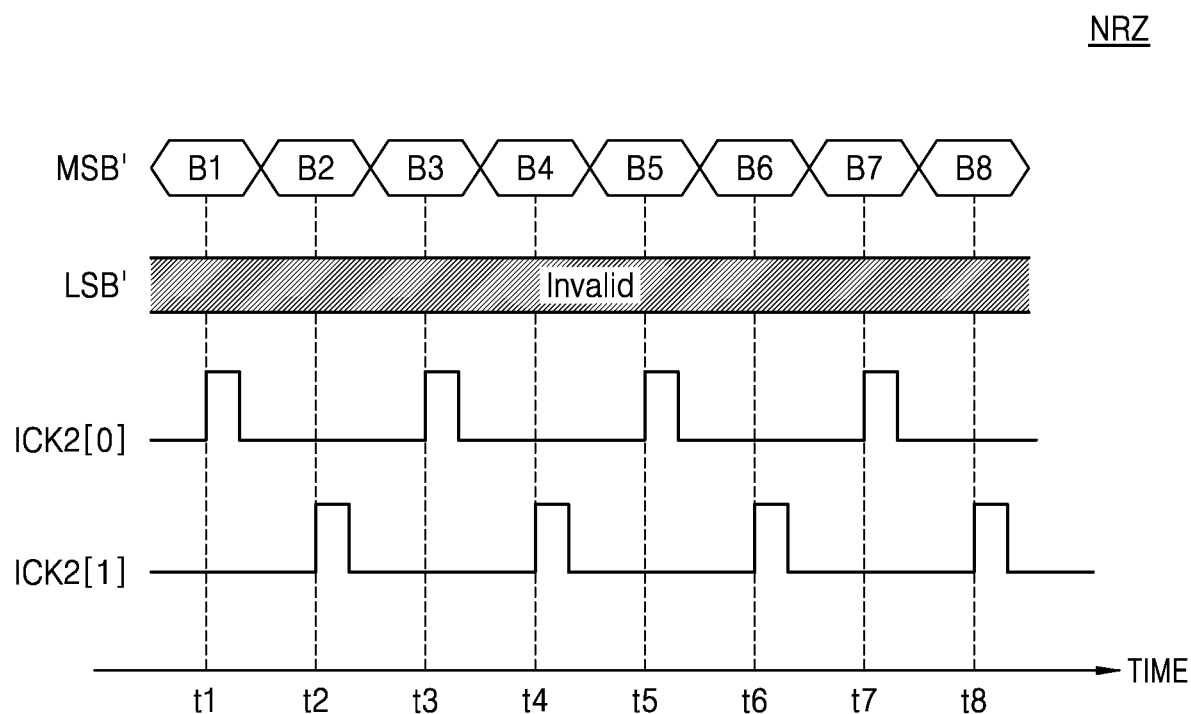
FIG. 15B is a timing diagram of an example operation of the register circuit in FIG. 13 in an NRZ mode.

FIG. 15A is a timing diagram of an example operation of the register circuit 375 in FIG. 13 in the PAM-4 mode. FIG. 15B is a timing diagram of an example operation of the register circuit 375 in FIG. 13 in the NRZ mode. Examples, in which, in the PAM-4 mode and NRZ mode, first through eighth bits B1 through B8 of the command CMD, the address ADDR, or the data DATA are stored in the register circuit 375 based on second internal clock signals ICK2[0] and ICK2[1], are described with reference to FIGS. 15A and 15B. The second internal clock signals ICK2[0] and ICK2[1] may have different phases from each other.

Referring to FIG. 15A, in the PAM-4 mode, the register circuit 375 may receive the most significant bit MSB' and the least significant bit LSB' having valid values. For example, at first through fourth time points t1 through t4, the register circuit 375 may receive bits B1, B3, B5, and B7 as the most significant bit MSB', respectively, and bits B2, B4, B6, and B8 as the least significant bit LSB', respectively. The register circuit 375 may store the first and second bits B1 and B2 at the first time point t1 based on the second internal clock signal ICK2[0] having a first phase, and may store the fifth and sixth bits B5 and B6 at the time point t3. For example, when the second internal clock signal ICK2[0] is high at the time point t1, the first and second bits B1 and B2 may be stored by the register circuit 375, and when the second internal clock signal ICK2[0] is high at the time point t3, the fifth and sixth bits may be stored by the register circuit 375. The register circuit 375 may store the third and fourth bits B3 and B4 at the second time point t2 based on the second internal clock signal ICK2[1] having a second phase, and may store the seventh and eighth bits B7 and B8 at the time point t4. The register circuit 375 may output the most significant bit MSB' and the least significant bit LSB' stored at each time point as the command CMD, the address ADDR, or the data DATA.

Referring to FIG. 15B, in the NRZ mode, the register circuit 375 may receive the most significant bit MSB' having a valid value and the least significant bit LSB' having an invalid value. For example, the register circuit 375 may receive the first through eighth bits B1 through B8 at the first through eighth time points t1 through t8, respectively, based on the most significant bit MSB'. The register circuit 375 may store the first, third, fifth, and seventh bits B1, B3, B5, and B7 at the first, third, fifth, and seventh time points t1, t3, t5, and t7, respectively, based on the second internal clock signal ICK2[0] having the first phase. In other words, the register circuit 375 may store the first, third, fifth, and seventh bits B1, B3, B5, and B7 at the first, third, fifth, and seventh time points t1, t3, t5, and t7, respectively, when the second internal clock signal ICK2[0] has a high level. The register circuit 375 may store the second, fourth, sixth, and eighth bits B2, B4, B6, and B8 at the second, fourth, sixth, and eighth time points t2, t4, t6, and t8, respectively, based on the second internal clock signal ICK2[1] having the second phase. In other words, the register circuit 375 may store the second, fourth, sixth, and eighth bits B2, B4, B6, and B8 at the second, fourth, sixth, and eighth time points t2, t4, t6, and t8, respectively, when the second internal clock signal ICK2[1] has the high level. The register circuit 375 may output only the most significant bit MSB' stored at each time point as the command CMD, the address ADDR, or the data DATA.

In FIGS. 15A and 15B, an example in which the register circuit 375 operates based on two second internal clock signals, in other words, ICK2[0] and ICK2[1], is described, but the number of the second internal clock signal ICK2 may be variously changed. For example, the number of second internal clock signals ICK2 may vary according to the number of internal registers of the register circuit 375.

Figure 16:
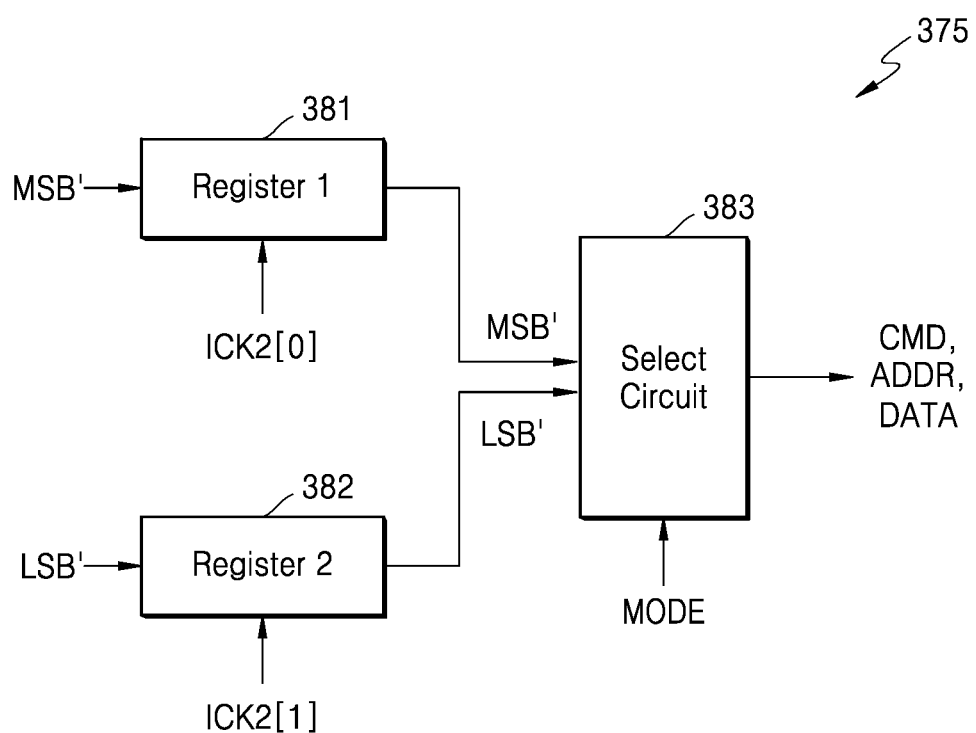
FIG. 16 is an example block diagram of the register circuit in FIG. 13.

FIG. 16 is an example block diagram of the register circuit 375 in FIG. 13. The register circuit 375 for performing the operation examples of FIGS. 15A and 15B may be described with reference to FIG. 16. The register circuit 375 may include a first register 381, a second register 382, and a select circuit 383.

The first register 381 may store the most significant bit MSB' based on the second internal clock signal ICK2[0]. For example, as described with reference to FIGS. 15A and 15B, the first register 381 may store the most significant bit MSB' having a valid value in the PAM-4 mode and the NRZ mode.

The second register 382 may store the least significant bit LSB' based on the second internal clock signal ICK2[1]. For example, as described with reference to FIGS. 15A and 15B, the second register 382 may store the least significant bit LSB' having a valid value in the PAM-4 mode, and may store the least significant bit LSB' having an invalid value in the NRZ mode.

The select circuit 383 may receive the most significant bit MSB' and the least significant bit LSB' stored in the first register 381 and the second register 382. The select circuit 383 may output bits corresponding to the command CMD, the address ADDR, or the data DATA based on the most significant bit MSB' and the least significant bit LSB' according to the mode signal MODE. For example, the select circuit 383 may output both the most significant bit MSB' and the least significant bit LSB' in the PAM-4 mode, and output only the most significant bit MSB' in the NRZ mode.

As described above, when the command CMD and the address ADDR are received in the PAM-4 method, the select circuit 383 may output the most significant bit MSB' and the least significant bit LSB' as the command CMD and the address, respectively. When the data DATA is received in the NRZ method, the select circuit 383 may output only the most significant bit MSB' as the data DATA.

Figure 17:
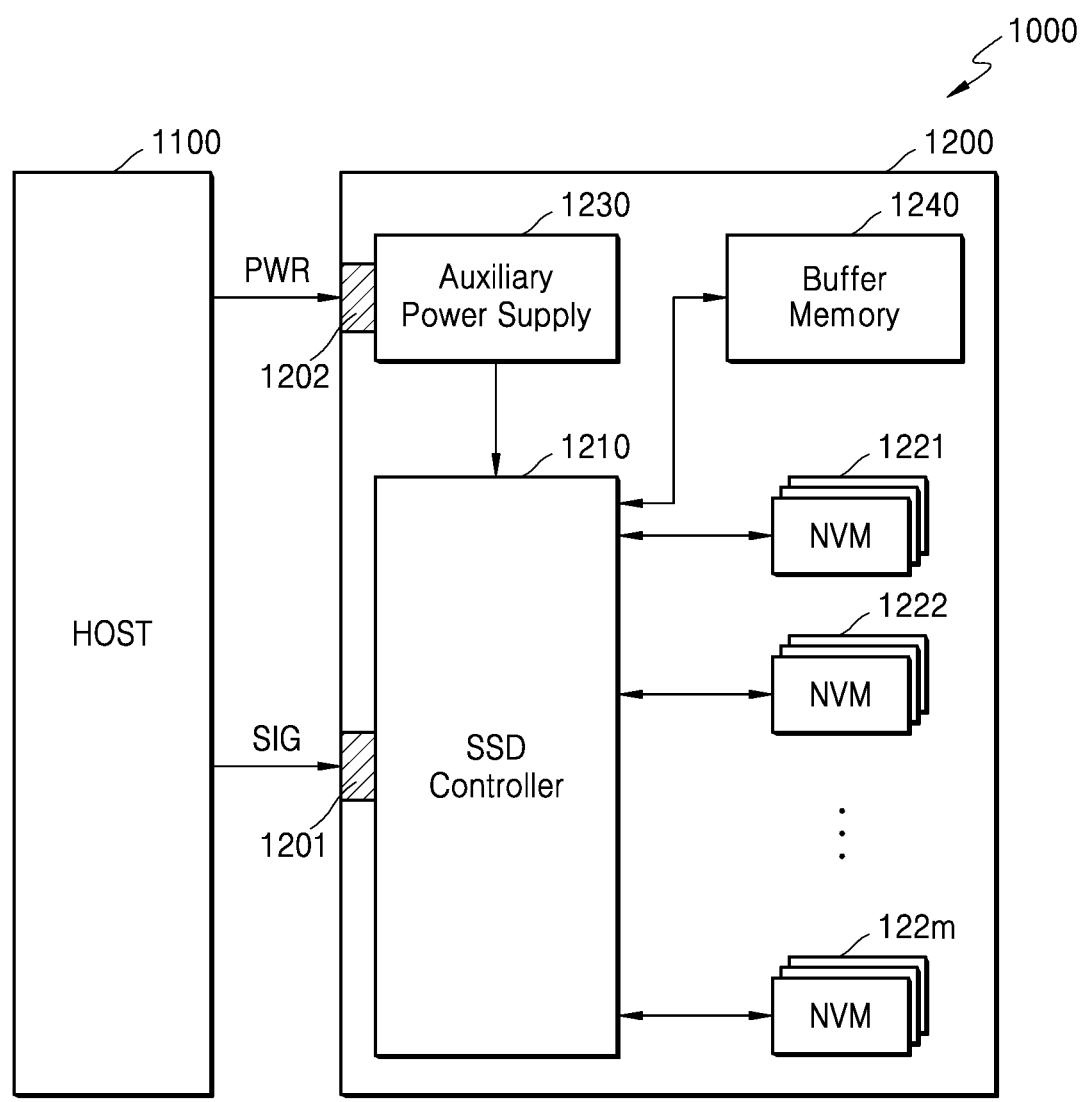
FIG. 17 is a block diagram of a solid state drive (SSD) system to which a memory device is applied, according to an embodiment of the inventive concept.

FIG. 17 is a block diagram of a solid state drive (SSD) system to which a memory device is applied, according to an embodiment of the inventive concept. Referring to FIG. 17, a SSD system 1000 may include a host 1100 and an SSD 1200.

The SSD 1200 may exchange a signal SIG with the host 1100 via a signal connector 1201, and receive power PWR via a power connector 1202. The SSD 1200 may include an SSD controller 1210, a plurality of flash memories (NVMs) 1221 through 122m, an auxiliary power supply 1230, and a buffer memory 1240. Each of the plurality of NVMs 1221 through 122m may be connected to the SSD controller 1210 via a plurality of channels.

The SSD controller 1210 may control the plurality of NVMs 1221 through 122m in response to the signal SIG received from the host 1100. The SSD controller 1210 may store a signal generated internally or transmitted from the outside (for example, the signal SIG received from the host 1100) in the buffer memory 1240. The SSD controller 1210 may correspond to the memory controllers 200 and 400 described above with reference to FIGS. 1 through 16. For example, the SSD controller 1210 may transmit the command CMD and the address ADDR to the plurality of NVMs 1221 through 122m in the PAM-4 method, and may transmit the data DATA to the plurality of NVMs 1221 through 122m in the NRZ method. Accordingly, the input/output efficiency of the SSD 1200 may be increased.

The plurality of NVMs 1221 through 122m may operate under the control of the SSD controller 1210. The auxiliary power supply 1230 may be connected to the host 1100 via the power connector 1202. Each of the plurality of NVMs 1221 through 122m may correspond to the memory devices 100 and 200 described above with reference to FIGS. 1 through 16. For example, each of the plurality of flash memories 1221 through 122m may sample the command CMD and the address ADDR in the PAM-4 mode, and sample the data DATA in the NRZ mode.

The auxiliary power supply 1230 may be connected to the host 1100 via the power connector 1202. The auxiliary power supply 1230 may receive power PWR from the host 1100, and charge the received power PWR. The auxiliary power supply 1230 may provide power of the SSD 1200 when power supply from the host 1100 is not smooth.

Figure 18:
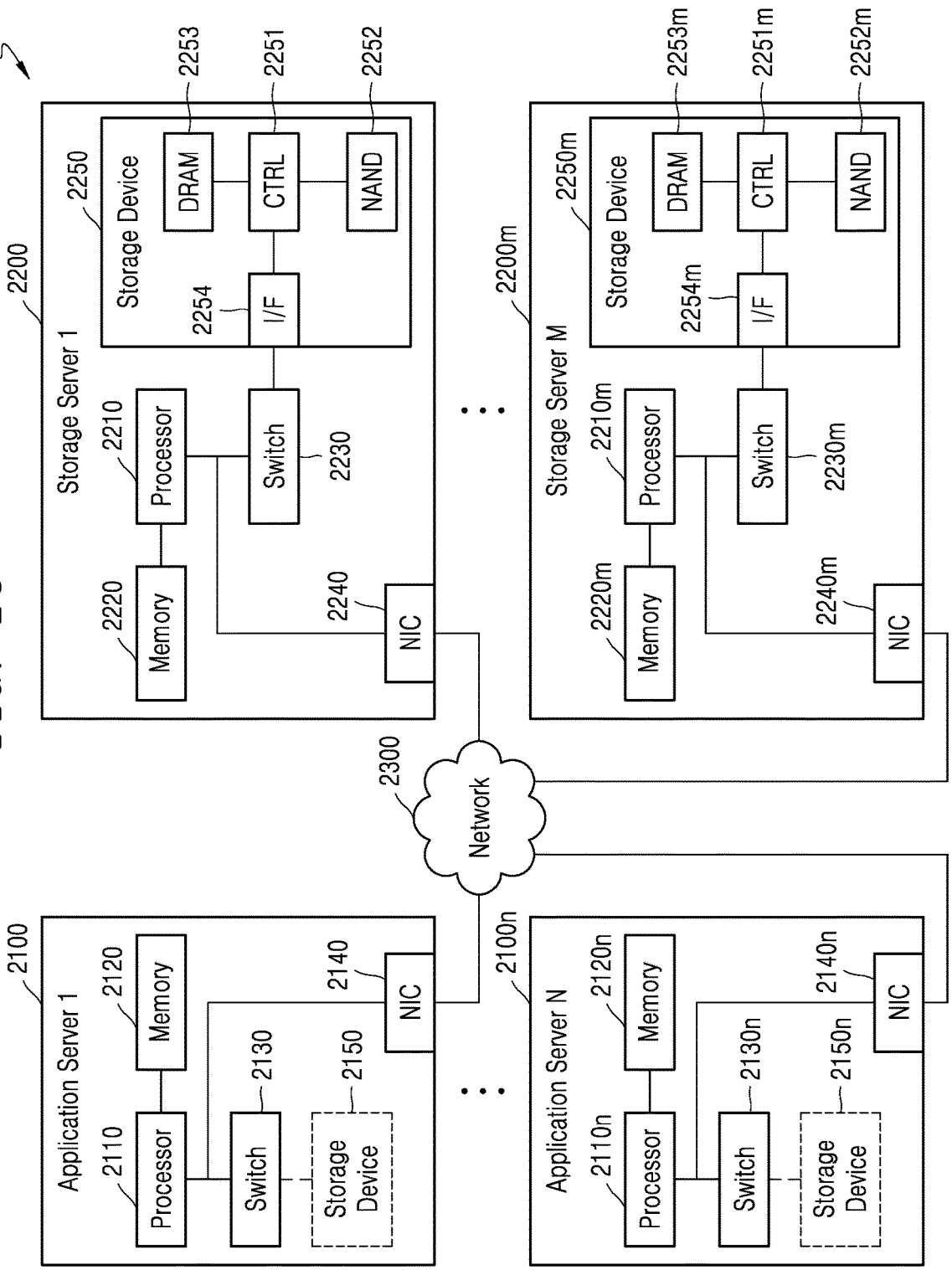
FIG. 18 is a block diagram of a network system to which a memory system is applied, according to an embodiment of the inventive concept.

FIG. 18 is a block diagram of a network system to which a memory system is applied, according to an embodiment of the inventive concept. Referring to FIG. 18, a network system 2000 may be a facility in which various data is collected and services are provided, and may be referred to as a data center or a data storage center. The network system 2000 may include application servers 2100 through 2100n and storage servers 2200 through 2200m, and the application servers 2100 through 2100n and the storage servers 2200 through 2200m may be referred to as computing nodes. The number of application servers 2100 through 2100n and the number of storage servers 2200 through 2200m may be variously selected according to embodiments of the inventive concept, and the number of application servers 2100 through 2100n and the number of storage servers 2200 through 2200m may be different from each other.

The application servers 2100 through 2100n and the storage servers 2200 through 2200m may communicate with each other via a network 2300. The network 2300 may be implemented by using fiber channel (FC), Ethernet, or the like. In this case, the FC may be a medium used for high speed data transfer, and may use an optical switch providing high performance/high availability. According to an access method of the network 2300, the storage servers 2200 through 2200m may be provided as file storages, block storages, or object storages.

In an embodiment of the inventive concept, the network 2300 may include a storage-dedicated network such as a storage area network (SAN). For example, the SAN may include a FC-SAN that is implemented according to FC protocol (FCP) by using an FC network. In an embodiment of the inventive concept, the SAN may include an internet protocol (IP) SAN (IP-SAN) that is implemented according to an Internet (i) small computer system interface (SCSI) (iSCSI), that is SCSI over transmission control protocol/Internet protocol (TCP/IP) or Internet SCSI protocol, by using a TCP/IP network. In an embodiment of the inventive concept, the network 2300 may include a general network such as the TCP/IP network. For example, the network 2300 may be implemented according to a protocol such as FC over Ethernet (FCOE), a network-attached storage (NAS), and a node version manager (NVM) express (NVMe) over fabrics (oF) (NVMe-oF).

Hereinafter, the application server 2100 and the storage server 2200 are mainly described. Descriptions of the application server 2100 may be applied to other application servers, e.g., 2100n, and descriptions of the storage server 2200 may be applied to other storage servers, e.g., 2200m.

The application server 2100 may include a processor 2110 and a memory 2120. The processor 2110 may control all operations of the application server 2100, and may access the memory 2120 to execute commands and/or data loaded in the memory 2120. According to an embodiment of the inventive concept, the number of processors 2110 and the number of memories 2120 included in the application server 2100 may be variously selected. In an embodiment of the inventive concept, the processor 2110 and the memory 2120 may provide a processor-memory pair. In an embodiment of the inventive concept, the number of processors 2110 and the number of memories 2120 may be different from each other.

The application server 2100 may further include a storage device 2150. The number of storage devices 2150 included in the application server 2100 may be variously selected, according to embodiments of the inventive concept. The processor 2110 may provide a command to the storage device 2150, and the storage device 2150 may operate in response to a command received from the processor 2110. However, the inventive concept is not limited thereto, and the application server 2100 may not include the storage device 2150.

The application server 2100 may further include a switch 2130 and a network interface card (NIC) 2140. The switch 2130 may selectively connect the processor 2110 to the storage device 2150 under the control of the processor 2110, or may selectively connect the NIC 2140 to the storage device 2150. The NIC 2140 may include a wired interface, a wireless interface, a Bluetooth interface, an optical interface, or the like. In an embodiment of the inventive concept, the processor 2110 and the NIC 2140 may be integrated into one body. In an embodiment of the inventive concept, the storage device 2150 and the NIC 2140 may be integrated into one body.

The application server 2100 may store data requested by the user or client to be stored in one of the storage servers 2200 through 2200m via the network 2300. In addition, the application server 2100 may obtain data requested by the user or client to be read from one of the storage servers 2200 through 2200m via the network 2300. For example, the application server 2100 may be implemented as a web server, a database management system (DBMS), or the like.

The application server 2100 may access the memory 2120n or the storage device 2150n included in another application server 2100n via the network 2300, or may access memories 2220 and 2220m or storage devices 2250 and 2250m included in the storage servers 2200 and 2220m via the network 2300, respectively. Accordingly, the application server 2100 may perform various operations on data stored in the application servers 2100 and 2100n and/or the storage servers 2200 and 2200m. For example, the application server 2100 may execute a command for moving or copying data between the application servers 2100 and 2100n and/or the storage servers 2200 and 2200m. In this case, data may be moved in an encrypted state for security or privacy via the network 2300.

The storage server 2200 may include a processor 2210 and a memory 2220. The processor 2210 may control all operations of the storage server 2200, and access the memory 2220 to execute commands and/or data loaded in the memory 2220. According to an embodiment of the inventive concept, the number of processors 2210 and the number of memories 2220 included in the storage server 2200 may be variously selected. In an embodiment of the inventive concept, the processor 2210 and the memory 2220 may be configured as a processor-memory pair. In an embodiment of the inventive concept, the number of processors 2210 and the number of memories 2220 may be different from each other.

The processor 2210 may include a single-core processor or a multi-core processor. For example, the processor 2210 may include a general-purpose processor, a central processing unit (CPU), a graphic processing unit (GPU), a digital signal processor (DSP), a microcontroller (MCU), a microprocessor, a network processor, an embedded processor, a field programmable gate array (FPGA), an application-specific instruction set processor (ASIP), and an application-specific integrated circuit processor (ASIC), etc.

The storage server 2200 may further include at least one storage device 2250. The number of storage devices 2250 included in the storage server 2200 may be variously selected, according to embodiments of the inventive concept. The storage device 2250 may include a controller (CTRL) 2251, a NAND flash memory (NAND) 2252, a DRAM 2253, and an interface (I/F) 2254. Hereinafter, the configuration and operation of the storage device 2250 are described in detail. The following description of the storage device 2250 may be applied to other storage devices 2150, 2150n, and 2250m.

The I/F 2254 may provide a physical connection of the processor 2210 to the CTRL 2251, and a physical connection of NIC 2240 to the CTRL 2251. For example, the I/F 2254 may be implemented in a direct attached storage (DAS) method of directly connecting the storage device 2250 to a dedicated cable. In addition, for example, the I/F 2254 may be implemented in various interface methods such as advanced technology attachment (ATA), serial ATA (SATA), external SATA (e-SATA), small computer system interface (SCSI), serial attached SCSI (SAS), peripheral component interconnect (PCI), PCI express (PCIe), node version manager (NVM) express (NVMe), IEEE 1394, universal serial bus (USB), a secure digital (SD) card, a multi-media card (MMC), an embedded multi-media card (eMMC), and a compact flash (CF) card.

The CTRL 2251 may control all operations of the storage device 2250. The CTRL 2251 may program data to the NAND 2252 in response to a program command, or may read data from the NAND 2252 in response to a read command. For example, the program command and/or the read command may be provided from the processor 2210 in the storage server 2200, the processor 2210m in another storage server 2200m, or the processors 2110 through 2110n in the application servers 2100 through 2100n, respectively, via the processor 2210, or directly.

The NAND 2252 may include a plurality of NAND flash memory cells. However, the inventive concept is not limited thereto, and the storage device 2250 may include other NVM except the NAND 2252, for example, resistive RAM (ReRAM), phase change RAM (PRAM), or magnetic RAM (MRAM), or a magnetic storage medium or an optical storage medium, or the like.

The DRAM 2253 may be used as a buffer memory. For example, the DRAM 2253 may be double data rate (DDR) SRAM (DDR SDRAM), low power DDR (LPDDR) SDRAM, graphics DDR (GDDR) SDRAM, rambus DRAM (RDRAM), or high bandwidth memory (HBM). However, the present inventive concept is not limited thereto, and the storage device 2250 may use a volatile memory (VM) or an NVM other than DRAM as a buffer memory. The DRAM 2253 may temporarily store (e.g., buffer) data to be programmed in the NAND 2252 or data read from the NAND 2252.

The storage server 2200 may further include a switch 2230 and the NIC 2240. The switch 2230 may selectively connect the processor 2210 to the storage device 2250, or may selectively connect the NIC 2240 to the storage device 2250, according to the control of the processor 2210. In an embodiment of the inventive concept, the processor 2210 and the NIC 2240 may be integrated into one body. In an embodiment of the inventive concept, the storage device 2250 and the NIC 2240 may be integrated into one body.

The storage devices 2150, 2150n, 2250, and 2250m may correspond to the memory systems 10 and 20 described above with reference to FIGS. 1 through 16. For example, the CTRL 2251 may transmit the command CMD and the address ADDR to the NAND 2252 in the PAM-4 method according to a request provided by one of the processors 2110, 2110n, 2210, and 2210m. In this case, the NAND 2252 may sample the command CMD and the address ADDR in the PAM-4 mode. The CTRL 2251 may transmit the data DATA to the NAND 2252 in the NRZ method. In this case, the NAND 2252 may sample the data DATA in the NRZ mode.

While the inventive concept has been particularly shown and described with reference to embodiments thereof, it will be understood that various changes in form and details may be made therein without departing from the spirit and scope of the following claims.

What is claimed is:

1. A memory device operating in two different operating modes, the memory device comprising:
   a memory cell array including Dynamic Random Access Memory (DRAM) cells; and
   a memory interface circuit configured to:
      receive a command/address signal via a first channel, the command/address signal having one of two different voltage levels,
      receive a data input/output signal via the first channel, the data input/output signal having one of N (N is a natural number of three or more) different voltage levels during a first operating mode and the data input/output signal having one of two different voltage levels during a second operating mode, sample the command address signal received via the first channel in a non-return to zero (NRZ) mode, and
sample the data input/output signal received via the first channel in a pulse amplitude modulation (PAM)-N mode during the first operating mode and in the NRZ mode during the second operating mode respectively.

2. The memory device of claim 1, wherein the memory interface circuit is further configured to receive a mode setting signal via the first channel.

3. The memory device of claim 2, wherein the memory device operates in one of the first operating mode and the second operating mode based on the mode setting signal.

4. The memory device of claim 2, wherein when the mode setting signal indicates the PAM-N mode, the memory device is configured to receive the command/address signal in the NRZ mode and receive the data input/output signal in the PAM-N mode.

5. The memory device of claim 4, wherein the memory device is further configured to program data into the memory cell array in response to a program command received in the NRZ mode, and
the memory device is further configured to read the data from the memory cell array in response to a read command received in the NRZ mode, and transmit the read data in the PAM-N mode.

6. The memory device of claim 2, wherein when the mode setting signal indicates the NRZ mode, the memory device is configured to receive the command/address signal in the NRZ mode and receive the data input/output signal in the NRZ mode.

7. The memory device of claim 6, wherein the memory device is further configured to program data into the memory cell array in response to a program command received in the NRZ mode, and
the memory device is further configured to read the data from the memory cell array in response to a read command received in the NRZ mode, and transmit the read data in the NRZ mode.

8. The memory device of claim 1, wherein the memory device is configured to generate two different reference voltages to sample the data input/output signal received via the first channel when the N is three during the first operating mode and to generate one reference voltage to sample the data input/output signal received via the first channel during the second operating mode.

9. The memory device of claim 1, wherein the memory interface circuit is further configured to receive a data strobe signal in a toggle state via the first channel as the data input/output signal including the data is received via the first channel, wherein the memory device operates in the PAM-N mode when the data strobe signal is in a toggle-off state, and operates in the NRZ mode when the data strobe signal is in the toggle state.

10. The memory device of claim 1, wherein the memory interface circuit comprises:
first through $(N-1)^{th}$ sense amplifiers configured to:
output first through $(N-1)^{th}$ comparison results by comparing a voltage level of the data input/output signal to each of first through $(N-1)^{th}$ reference voltages in the PAM-N mode, and
output the first through $(N-1)^{th}$ comparison results by comparing the voltage level of the data input/output signal to a one reference voltage of the first through $(N-1)^{th}$ reference voltages in the NRZ mode;
an output decoder configured to output M bits by performing decoding based on the first through $(N-1)^{th}$ comparison results; and
a register circuit configured to output the M bits output by the output decoder as the command, the address, or the data in the PAM-N mode, and output one bit of the M bits output by the output decoder as the command, the address, or the data in the NRZ mode.

11. The memory device of claim 10, wherein the first through $(N-1)^{th}$ sense amplifiers output as a value of each of remaining comparison results except for a comparison result corresponding to the one reference voltage among the first through $(N-1)^{th}$ comparison results in the NRZ mode.

12. An operating method of a memory device in two different operating modes, the memory device including Dynamic Random Access Memory (DRAM) cells, the method comprising:
receiving a command/address signal from a memory controller, the command/address signal having one of two different voltage levels,
receiving a data input/output signal from the memory controller, the data input/output signal having one of N (N is a natural number of three or more) different voltage levels during a first operating mode and the data input/output signal having one of two different voltage levels during a second operating mode;
sampling the received command/the address signal in a non-return to zero (NRZ) mode; and
sampling the received data input/output signal in a pulse amplitude modulation (PAM)-N mode during the first operating mode and in the NRZ mode during the second operating mode respectively.

13. The method of claim 12, further comprising:
receiving a mode setting signal from the memory controller.

14. The method of claim 13, wherein the memory device operates in one of the first operating mode and the second operating mode based on the received mode setting signal.

15. The method of claim 13, wherein when the mode setting signal indicates the PAM-N mode, the receiving of the command/address signal includes: receiving the command/address signal in the NRZ mode, and the receiving of the data input/output signal includes: receiving the data input/output signal in the PAM-N mode.

16. The method of claim 15, further comprising:
programming data into the DRAM cells in response to a program command received in the NRZ mode;
reading the data from the DRAM cells in response to a read command received in the NRZ mode; and
transmitting the read data in the PAM-N mode.

17. The method of claim 13, wherein when the mode setting signal indicates the NRZ mode, the receiving of the command/address signal includes: receiving the command/address signal in the NRZ mode, and the receiving of the data input/output signal includes: receiving the data input/output signal in the NRZ mode.

18. The method of claim 17, further comprising:
programming data into the DRAM cells in response to a program command received in the NRZ mode;
reading the data from the DRAM cells in response to a read command received in the NRZ mode; and
transmitting the read data in the NRZ mode.

19. The method of claim 12, further comprising:
generating two different reference voltages to sample the received data input/output signal received when the N is three during the first operating mode; and generating one reference voltage to sample the received data input/output signal during the second operating mode.

20. The method of claim 12, further comprising:

receiving a data strobe signal in a toggle state from the memory controller as the data input/output signal including the data is received, wherein the memory device operates in the PAM-N mode when the data strobe signal is in a toggle-off state, and operates in the NRZ mode when the data strobe signal is in the toggle state.

* * * * *